US012800708B2

(12) United States Patent
Yoshida et al.

(10) Patent No.: US 12,800,708 B2
(45) Date of Patent: Nov. 17, 2026

(54) SIGNAL GENERATING DEVICE AND RADAR SYSTEM

(71) Applicant: KABUSHIKI KAISHA TOSHIBA, Tokyo (JP)

(72) Inventors: Hiroshi Yoshida, Yokohama Kanagawa (JP); Yasuhiro Kanekiyo, Yokohama Kanagawa (JP); Hiroki Mori, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 214 days.

(21) Appl. No.: 18/592,954

(22) Filed: Mar. 1, 2024

(65) Prior Publication Data

US 2025/0044403 A1 Feb. 6, 2025

(30) Foreign Application Priority Data

Jul. 31, 2023 (JP) ................................ 2023-124520

(51) Int. Cl.
*G01S 7/03* (2006.01)
*G01S 7/35* (2006.01)
*G01S 13/04* (2006.01)
*G01S 13/88* (2006.01)

(52) U.S. Cl.
CPC ................ *G01S 7/03* (2013.01); *G01S 7/354* (2013.01); *G01S 13/04* (2013.01); *G01S 13/886* (2013.01)

(58) Field of Classification Search
CPC .......... G01S 13/931; G01S 7/03; G01S 7/032; G01S 7/035; G01S 7/35
USPC ...................................... 342/27, 70, 82, 192
See application file for complete search history.

(56) References Cited

U.S. PATENT DOCUMENTS 4,599,579 A * 7/1986 McCann ................. H03L 7/081 331/1 R
5,225,840 A * 7/1993 Hsu ........................ H03B 21/00 455/76
5,924,021 A * 7/1999 Paul ....................... H03D 7/163 455/84
5,940,457 A * 8/1999 Dreifuss .............. H03C 3/0933 375/376

(Continued)

FOREIGN PATENT DOCUMENTS

CN 116500597 A 7/2023
GB 1383699 A 2/1974

(Continued)

OTHER PUBLICATIONS

Ahmed, et al., "A Novel Fully Electronic Active Real-Time Imager Based on a Planar Multistatic Sparse Array", IEEE Transactions on Microwave Theory and Techniques (vol. 59, No. 12), 2011, pp. 3567-3576, DOI: 10.1109/TMTT.2011.2172812.

(Continued)

*Primary Examiner* — Michael W Justice
(74) *Attorney, Agent, or Firm* — Holtz, Holtz & Volek PC

(57) ABSTRACT

According to one embodiment, a signal generating device is connected to a radar. The signal generating device includes a high-frequency signal generator configured to generate a high-frequency signal, a control signal generator configured to generate a first control signal for controlling the first radar, and a signal synthesizer configured to generate a first synthesized signal including the high-frequency signal and the first control signal.

13 Claims, 15 Drawing Sheets

(56) References Cited

U.S. PATENT DOCUMENTS

| | | | | |
|---|---|---|---|---|
| 6,587,071 | B2 * | 7/2003 | Meier | G01S 13/12 342/72 |
| 7,664,203 | B2 * | 2/2010 | Tu | H03D 3/007 375/243 |
| 7,705,773 | B2 * | 4/2010 | Vacanti | G01S 7/35 342/174 |
| 8,547,273 | B2 * | 10/2013 | Aoyagi | G01S 7/292 342/134 |
| 8,686,898 | B2 * | 4/2014 | Beasley | G01S 7/354 342/195 |
| 8,994,586 | B1 * | 3/2015 | Choi | G01S 7/35 342/128 |
| 9,294,178 | B2 * | 3/2016 | Jung | H04B 7/086 |
| 9,660,655 | B2 * | 5/2017 | Josefsberg | H03L 7/185 |
| 9,664,777 | B2 * | 5/2017 | Kishigami | G01S 7/023 |
| 9,705,511 | B2 * | 7/2017 | Josefsberg | H03L 7/20 |
| 9,762,251 | B2 * | 9/2017 | Josefsberg | H03L 1/028 |
| 9,880,261 | B2 * | 1/2018 | Subburaj | G01S 13/87 |
| 10,061,016 | B2 * | 8/2018 | Ginsburg | G01S 7/4008 |
| 10,498,346 | B2 * | 12/2019 | Tong | H03L 7/18 |
| 10,788,569 | B2 * | 9/2020 | Lin | G01S 7/0233 |
| 11,022,674 | B2 * | 6/2021 | Takeuchi | G01S 13/87 |
| 11,035,928 | B2 * | 6/2021 | Subburaj | G01S 7/032 |
| 11,209,534 | B2 * | 12/2021 | Leabman | A61B 5/021 |
| 11,223,128 | B2 * | 1/2022 | Doak | G01S 7/35 |
| 11,327,152 | B2 * | 5/2022 | Mayer | G01S 13/584 |
| 11,336,227 | B2 * | 5/2022 | Yin | H03B 5/04 |
| 11,656,320 | B2 * | 5/2023 | Fang | G01S 7/35 342/109 |
| 11,668,796 | B2 * | 6/2023 | Scherz | G01S 7/4008 342/165 |
| 11,899,127 | B2 * | 2/2024 | Crouch | G01S 13/583 |
| 12,189,023 | B2 * | 1/2025 | Otowa | G01S 13/42 |
| 12,474,445 | B2 * | 11/2025 | Lyu | G01S 7/032 |
| 2002/0158791 | A1 * | 10/2002 | Meier | G01S 13/12 340/901 |
| 2004/0130482 | A1 * | 7/2004 | Lin | G01S 7/35 342/120 |
| 2006/0239472 | A1 * | 10/2006 | Oda | H03G 5/165 704/E21.009 |
| 2010/0073052 | A1 * | 3/2010 | Choi | H03L 7/185 327/157 |
| 2011/0227784 | A1 * | 9/2011 | Beasley | G01S 7/354 375/295 |
| 2012/0326912 | A1 * | 12/2012 | Aoyagi | G01S 7/292 342/21 |
| 2013/0241766 | A1 * | 9/2013 | Kishigami | G01S 7/0235 342/159 |
| 2016/0187464 | A1 * | 6/2016 | Ginsburg | G01S 13/87 342/168 |
| 2016/0373117 | A1 * | 12/2016 | Josefsberg | H03L 7/20 |
| 2017/0016984 | A1 * | 1/2017 | Lin | G01F 1/002 |
| 2017/0023663 | A1 * | 1/2017 | Subburaj | G01S 7/036 |
| 2017/0099057 | A1 * | 4/2017 | Josefsberg | H03L 1/028 |
| 2017/0099058 | A1 * | 4/2017 | Josefsberg | H03L 1/028 |
| 2017/0315211 | A1 * | 11/2017 | Subburaj | G01S 7/032 |
| 2018/0267144 | A1 * | 9/2018 | Lin | G01S 7/4021 |
| 2018/0267165 | A1 | 9/2018 | Steinbuch et al. | |
| 2019/0140653 | A1 * | 5/2019 | Tong | H03L 7/24 |
| 2019/0219683 | A1 * | 7/2019 | Fang | G01S 13/93 |
| 2019/0235051 | A1 | 8/2019 | Melzer et al. | |
| 2019/0386391 | A1 * | 12/2019 | Doak | G01S 7/282 |
| 2020/0025899 | A1 | 1/2020 | Starzer et al. | |
| 2020/0191906 | A1 * | 6/2020 | Mayer | G01S 13/584 |
| 2020/0191945 | A1 * | 6/2020 | Leabman | G01S 7/282 |
| 2021/0156959 | A1 * | 5/2021 | Scherz | G01S 7/352 |
| 2021/0175850 | A1 * | 6/2021 | Yin | H03L 7/099 |
| 2021/0263146 | A1 * | 8/2021 | Otowa | G01S 7/0232 |
| 2022/0099795 | A1 * | 3/2022 | Crouch | G01S 13/003 |
| 2023/0160999 | A1 * | 5/2023 | Lyu | G01S 7/40 |
| 2023/0236292 | A1 * | 7/2023 | Sun | G01S 7/4817 356/4.01 |
| 2024/0248172 | A1 * | 7/2024 | Yoshida | G01S 7/40 |

FOREIGN PATENT DOCUMENTS

| | | | |
|---|---|---|---|
| JP | S4741215 | Y1 | 12/1972 |
| JP | 2006197343 | A | 7/2006 |
| JP | 2011015354 | A | 1/2011 |
| JP | 2018535392 | A | 11/2018 |
| JP | 2019039917 | A | 3/2019 |
| JP | 2019132838 | A | 8/2019 |
| JP | 2020017874 | A | 1/2020 |
| JP | 2024104504 | | 8/2024 |
| WO | 2022014010 | A1 | 1/2022 |

OTHER PUBLICATIONS

Rohde & Schwarz, "Microwave Imaging", 2016, 6 pages, https://www.rohdeschwarz.com/jp/solutions/aerospace-defensesecurity/security/security-scanner/microwaveimaging-theme_233560.html.

Japanese Office Action (and an English language translation thereof) dated Feb. 24, 2026, issued in corresponding Japanese Application No. 2023-124520.

Japanese Office Action (and an English language translation thereof) dated Jun. 2, 2026, issued in corresponding Japanese Application No. 2023-124520.

* cited by examiner

SIGNAL GENERATING DEVICE AND RADAR SYSTEM

CROSS-REFERENCE TO RELATED APPLICATIONS

This application is based upon and claims the benefit of priority from Japanese Patent Application No. 2023-124520, filed Jul. 31, 2023, the entire contents of which are incorporated herein by reference.

FIELD

Embodiments described herein relate generally to a signal generating device and a radar system.

BACKGROUND

A MIMO (multiple-input and multiple-output) radar system include a plurality of radars. One radar transmits electromagnetic waves at a certain time. At the next time, all of the radars receive reflected electromagnetic waves.

The MIMO radar systems also include A signal generating device that generates a variety of signals necessary for radar operations. The signal generating device transmits to the radars via their respective signal lines of equal length such that the phases of the radar operations are aligned. If the signal lines between the signal generator and the radars are not of equal length, the detection accuracy of the radar system is low. However, there are a number of restrictions and difficulties in providing signal lines of equal length, which increases the costs of the radar system.

DETAILED DESCRIPTION

Figure 1:
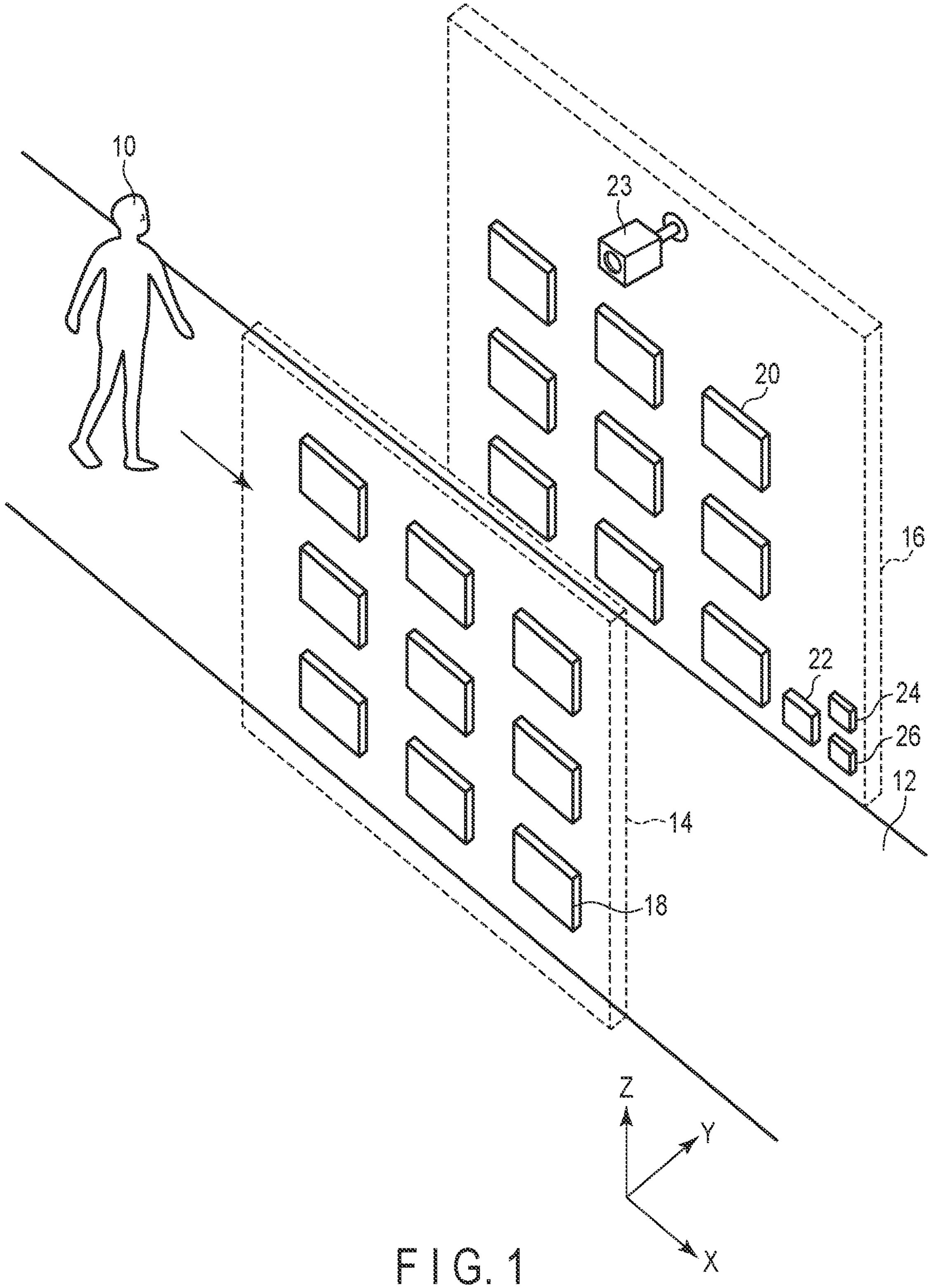
FIG. 1 is an illustration of an example of a MIMO radar system according to a first embodiment.

Embodiments will be described below with reference to the drawings. In the following descriptions, a device and a method are illustrated to embody the technical concept of the embodiments. The technical concept is not limited to the configuration, shape, arrangement, material or the like of the structural elements described below. Modifications that could easily be conceived by a person with ordinary skill in the art are naturally included in the scope of the disclosure. To make the descriptions clearer, the drawings may schematically show the size, thickness, planer dimension, shape, and the like of each element differently from those in the actual aspect. The drawings may include elements that differ in dimension and ratio. Elements corresponding to each other are denoted by the same reference numeral and their overlapping descriptions may be omitted. Some elements may be denoted by different names, and these names are merely an example. It should not be denied that one element is denoted by different names. Note that "connection" means that one element is connected to another element via still another element as well as that one element is directly connected to another element. If the number of elements is not specified as plural, the elements may be singular or plural.

In general, according to one embodiment, a signal generating device is connected to a radar. The signal generating device includes a high-frequency signal generator configured to generate a high-frequency signal, a control signal generator configured to generate a first control signal for controlling the first radar, and a signal synthesizer configured to generate a first synthesized signal including the high-frequency signal and the first control signal. A frequency of the high-frequency signal is higher than a frequency of the first control signal.

First Embodiment

An example of application of MIMO radar systems is a security system. The security system is installed in facilities where people gather, such as airports, train stations, shopping malls, concert halls, and exhibition halls. The security system determines whether an inspection target (a user of the facilities) has a specific item. The specific item is a hazardous material, such as a metal object and an explosive. The metal object includes a knife, a handgun, and the like. The security system irradiates the inspection target with electromagnetic waves and receives the electromagnetic waves reflected by the inspection target. Based on the strength of the reflected electromagnetic waves, the security system determines whether the inspection target has a specific item, that is, a dangerous material such as a metal object and an explosive. The security system can also determine whether the inspection target has a hazardous material based on the shape of the specific item in the image generated based on the strength of the reflected electromagnetic waves. The inspection target need not be stationary but may be walking during transmission of electromagnetic waves. A system that inspects an inspection target who is walking is referred to as a walk-through system.

FIG. 1 is an illustration of an example of a MIMO radar system according to the first embodiment. Although FIG. 1 illustrates a walk-through system that irradiates a person who is walking with electromagnetic waves, the first embodiment is also applicable to a stationary system that inspects a person who is stationary.

A plurality of radar clusters 18 are arranged in a matrix, e.g., in a matrix of 3 rows×3 columns on one sidewall 14 of a passage 12 on which a pedestrian 10 walks. On the other sidewall 16 of the passage 12, a plurality of radar clusters 20 are arranged in a matrix, e.g., in a matrix of 3 rows×3 columns. Each of the radar clusters 18 and 20 includes a plurality of radar units. Each of the radar units includes a plurality of transmitter/receiver modules. The radar units are installed on a substrate of each of the radar clusters 18 and 20. Alternatively, the radar units are arranged in an enclosure of each of the radar clusters 18 and 20.

The sidewalls 14 and 16 are parallel to each other. The longitudinal direction of the passage 12 is referred to as an X direction. The width direction of the passage 12 is referred to as a Y direction. The height direction of the passage 12 is referred to as a Z direction.

A signal generator 22 is installed on one of the sidewalls 14 and 16 (sidewall 16 in FIG. 1). The signal generator 22 generates a transmission signal, a reference signal, and a control signal which are necessary to control the MIMO radar system. The transmission signal is a source of electromagnetic waves transmitted from an antenna. The reference signal synchronizes the whole system. The control signal instructs the radar clusters on a transmission start timing. Though the transmission and reference signals have different frequencies, they are high-frequency signals. The control signal is a low-frequency, high-impedance logic signal.

The number of radar clusters installed on one sidewall is not limited to nine. Instead of placing the radar clusters 18 and 20 on their respective sidewalls 14 and 16, at least one of the radar cluster 18 or 20 may be installed on only one sidewall. If the radar clusters 18 and 20 are installed on both the sidewalls 14 and 16, at least one radar cluster 18 or 20 may be installed on each of the sidewalls 14 and 16.

The placement of the radar clusters 18 and 20 is not limited to the sidewalls 14 and 16, but may be installed, for example, on a ceiling of a building, on a floor of a passage, at a gate in the middle of a passage, and the like. The radar clusters 18 and 20 may be installed on not fixed objects such as the sidewalls 14 and 16 but on movable panels or the like, and the movable panels may be provided around a person who is stationary.

A camera 23 may be provided on at least one of the sidewalls 14 and 16. The camera 23 captures an image of the pedestrian 10 on the passage 12. The position of the pedestrian 10 is determined based on the captured image of the camera 23. Electromagnetic waves are emitted from at least one radar unit in the radar clusters 18 and 20 in accordance with the position of the pedestrian 10, and reflected waves are received by at least one radar unit in accordance with the position of the pedestrian 10. The camera 23 may be replaced with a sensor capable of detecting the position of the pedestrian 10 on the passage 12. Alternatively, without providing the camera 23 or the sensor, the position of the pedestrian 10 may be detected based on signals received by the radar clusters 18 and 20.

Figure 2:
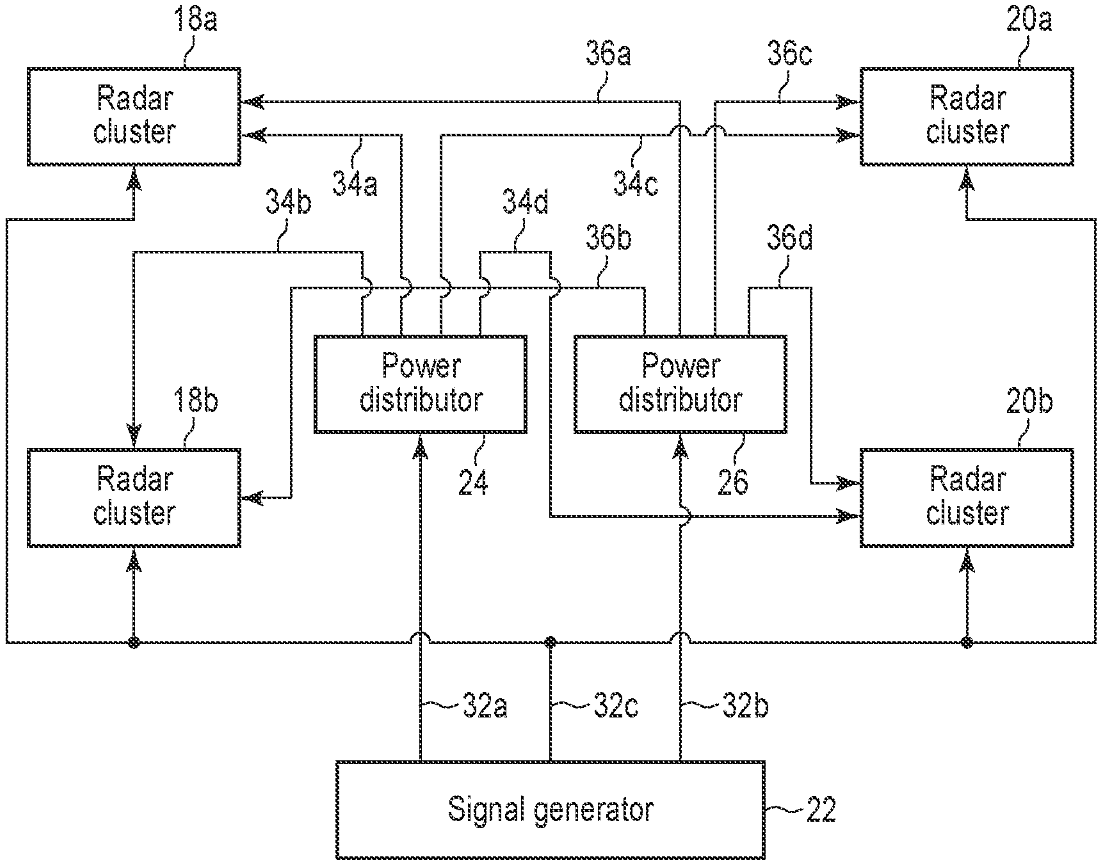
FIG. 2 is a block diagram illustrating an example of interconnection between a signal generator and radar clusters according to a reference example.

FIG. 2 is a block diagram illustrating an example of interconnection between the signal generator 22 and the radar clusters 18 and 20 according to a reference example. For the sake of illustration, two radar clusters 18*a* and 18*b* are installed on the side wall 14 and two radar clusters 20*a* and 20*b* are installed on the sidewall 16.

The signal generator 22 is connected to a power distributor 24 via a signal line 32*a*. Like the signal generator 22, the power distributor 24 is installed on the sidewall 16. The signal line 32*a* transmits the transmission signal. The power distributor 24 distributes the power of the transmission signal (input signal) into four output signals. The power of one output signal is about ¼ of the power of the input signal. The four output signals (the transmission signals) of the power distributor 24 are input to the radar clusters 18*a*, 18*b*, 18*c*, and 18*d* via signal lines 34*a*, 34*b*, 34*c*, and 34*d*, respectively.

The signal generator 22 is connected to a power distributor 26 via a signal line 32*b*. Like the power distributor 24, the power distributor 26 is installed on the sidewall 16. The signal line 32*b* transmits a reference signal. The power distributor 26 distributes the power of the reference signal (input signal) into four output signals. The power of one output signal is about ¼ of the power of the input signal. The four output signals (reference signals) of the power distributor 26 are input to the radar clusters 18*a*, 18*b*, 18*c*, and 18*d* via signal lines 36*a*, 36*b*, 36*c*, and 36*d*, respectively.

The signal generator 22 is connected to the radar clusters 18*a*, 18*b*, 18*c*, and 18*d* via a signal line 32*c*. The signal line 32*c* transmits a control signal. Since the control signal is a low-frequency, high-impedance logic signal, it need not be distributed through a power distributor. The signal line 32*c* is divided into four branches, and the four branches are connected to their respective radar clusters 18*a*, 18*b*, 18*c*, and 18*d*.

The signal lines between the signal generator 22 and the radar clusters 18*a*, 18*b*, 18*c*, and 18*d* are preferably of equal length. Since the power distributors 24 and 26 are interposed between the signal generator 22 and the radar clusters 18*a*, 18*b*, 18*c*, and 18*d*, the number of signal lines between the signal generator 22 and the radar clusters 18*a*, 18*b*, 18*c*, and 18*d* increases. Therefore, there are a number of restrictions and difficulties in making the signal lines of equal length, which increases the manufacturing costs of the radar system.

Figure 3:
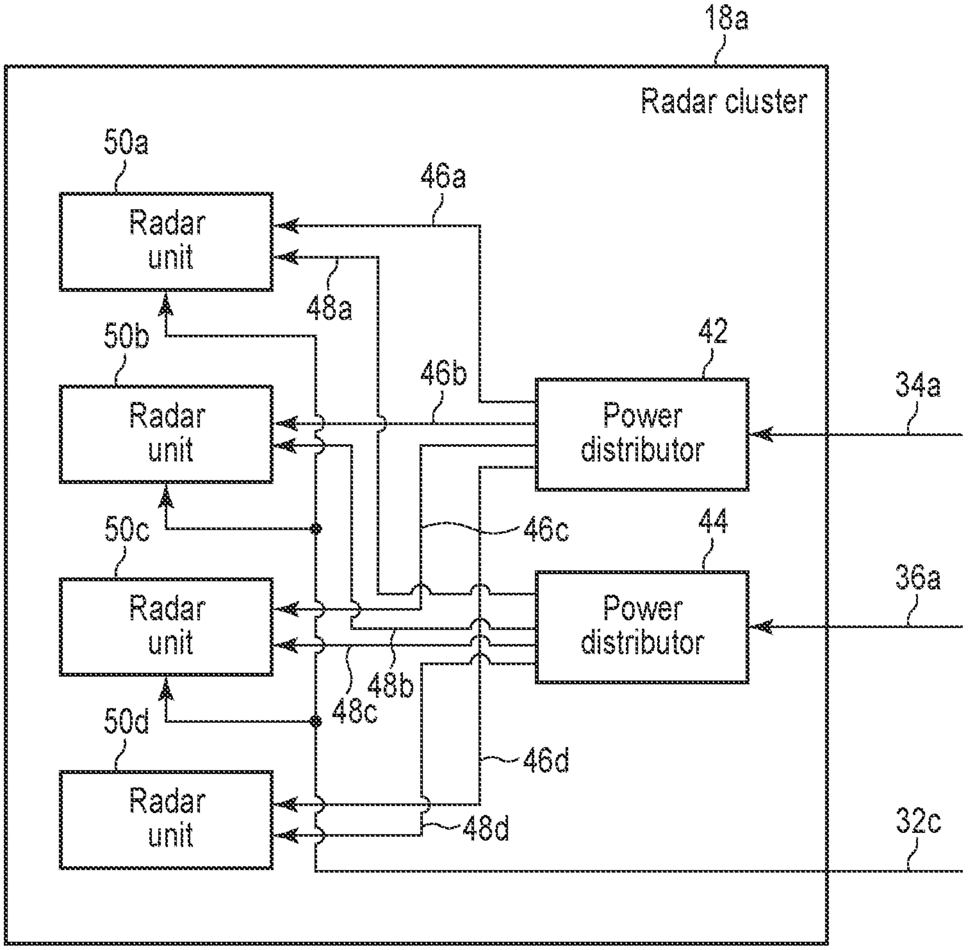
FIG. 3 is a block diagram illustrating an example of the radar clusters according to the reference example.

FIG. 3 is a block diagram illustrating an example of the radar clusters 18*a*, 18*b*, 18*c*, and 18*d* according to the reference example. The radar cluster 18*a*, 18*b*, 18*c*, and 18*d* are the same in configuration. For the sake of illustration, only the radar cluster 18*a* is illustrated in FIG. 3. The radar cluster 18*a* includes a plurality of radar units, e.g., four radar units 50*a*, 50*b*, 50*c*, and 50*d*, and power distributors 42 and 44. The radar units 50*a*, 50*b*, 50*c*, and 50*d* are the same in configuration. Each of the radar units 50*a*, 50*b*, 50*c*, and 50*d* includes a plurality of transmitting antennas, a plurality of receiving antennas, and a plurality of transmitter/receiver circuits.

The transmission signal is input from the power distributor 24 to the power distributor 42 via the signal line 34*a*. The power distributor 42 distributes the power of the transmission signal (input signal) into four output signals. The power of one output signal is about ¼ of the power of the input signal. The four output signals (the transmission signals) of the power distributor 42 are input to the radar units 50*a*, 50*b*, 50*c*, and 50*d* via signal lines 46*a*, 46*b*, 46*c* and 46*d*, respectively.

A reference signal is input from the power distributor 24 to the power distributor 44 via a signal line 36*a*. The power distributor 44 distributes the power of the reference signal (input signal) into four output signals. The power of one output signal is about ¼ of the power of the input signal. The four output signals (reference signals) of the power distributor 44 are input to the radar units 50*a*, 50*b*, 50*c*, and 50*d* via signal lines 48*a*, 48*b*, 48*c*, and 48*d*, respectively.

A control signal is transmitted from the signal generator 22 to the radar units 50*a*, 50*b*, 50*c*, and 50*d* via a signal line 32*c*.

Each of the radar units 50*a*, 50*b*, 50*c*, and 50*d* performs radar operation in response to the transmission signal, the reference signal, and the control signal, that is, transmission of electromagnetic waves based on the transmission signal and reception of electromagnetic waves. The operation timings of the radar units 50*a*, 50*b*, 50*c*, and 50*d* may differ from one another according to the control signal. The operation timings of transmitter/receiver circuits of each of the radar units 50*a*, 50*b*, 50*c*, and 50*d* are the same.

The signal lines of the radar clusters 18*a*, 18*b*, 18*c*, and 18*d* are of equal length. The signal lines 46*a*, 46*b*, 46*c*, and 46*d* are of equal length. The signal lines 48*a*, 48*b*, 48*c*, and 48*d* are of equal length. The signal lines 34*a*, 34*b*, 34*c*, and 34*d* between the power distributor 24 and the radar clusters 18*a*, 18*b*, 18*c*, and 18*d* are of equal length. The signal lines 36*a*, 36*b*, 36*c*, and 36*d* between the power distributor 26 and the radar clusters 18*a*, 18*b*, 18*c*, and 18*d* are of equal length.

Next is a description of an example of signal lines between the signal generator 22 and the radar clusters 18 and 20 according to the first embodiment. First is a description of an example of a radar system including a single signal generator 100 and a single radar cluster 130.

Figure 4:
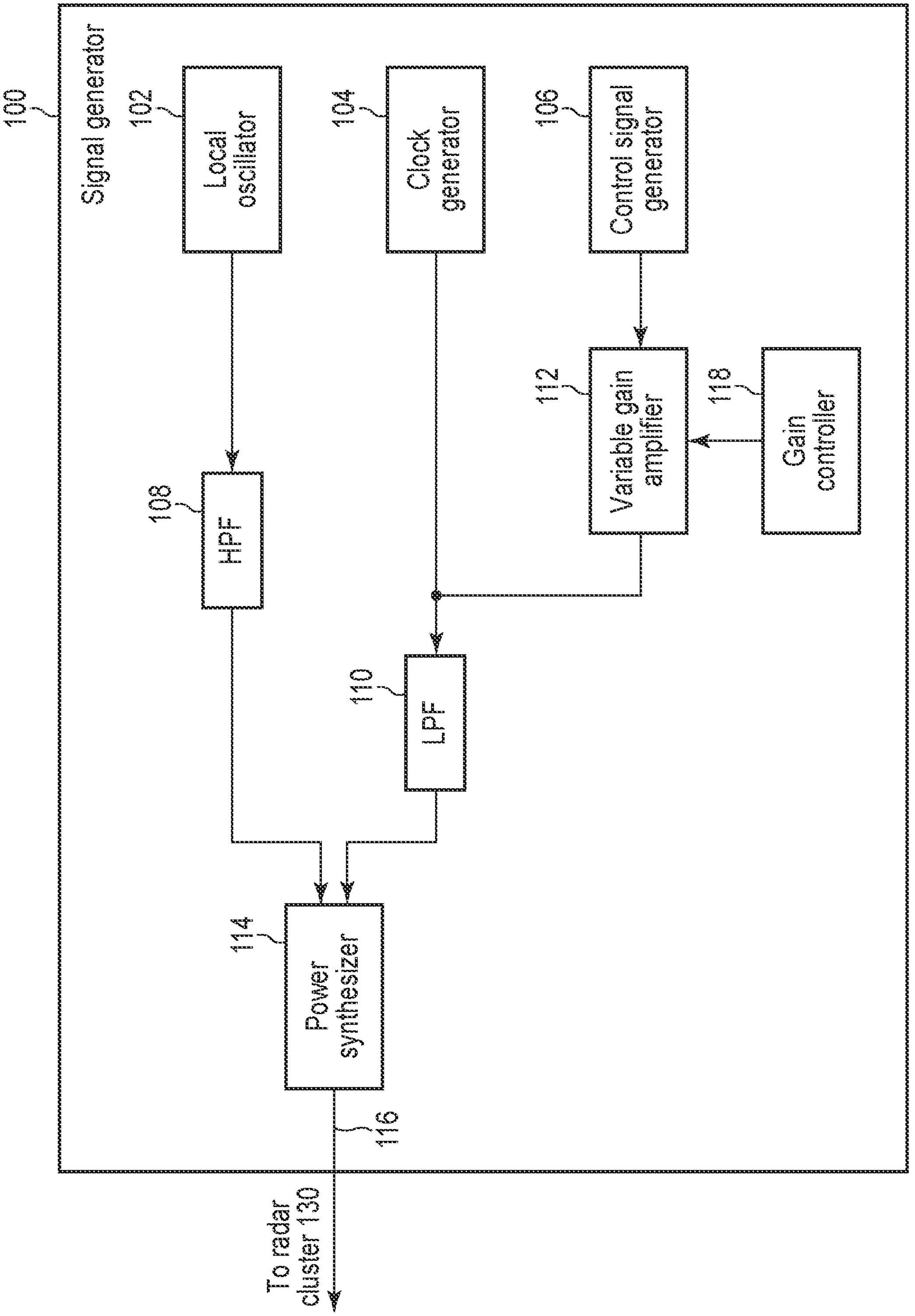
FIG. 4 is a block diagram illustrating an example of the signal generator according to the first embodiment.

FIG. 4 is a block diagram illustrating an example of the signal generator 100 according to the first embodiment. The signal generator 100 corresponds to the signal generator 22. Like the signal generator 22, the signal generator 100 is installed on the sidewall 16. The signal generator 100 includes a local oscillator 102, a clock generator 104, and a control signal generator 106.

The local oscillator 102 generates as the transmission signal a linear frequency modulated continuous wave (L-FMCW) signal whose frequency increases linearly with time. In this specification, the L-FMCW signal is also referred to as a chirp signal.

Figure 5A:
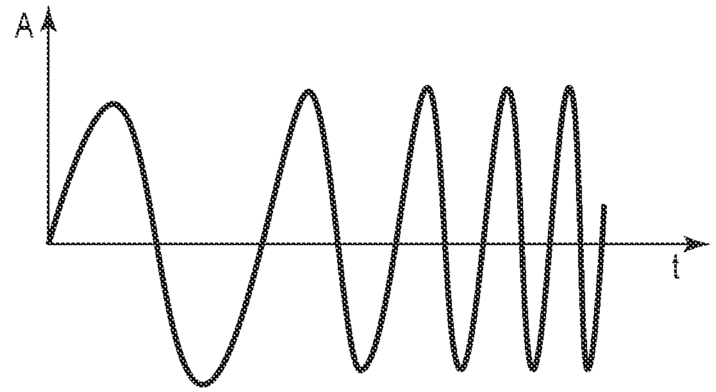
FIGS. 5A and 5B are diagrams illustrating an example of a transmission signal according to the first embodiment.
Figure 5B:
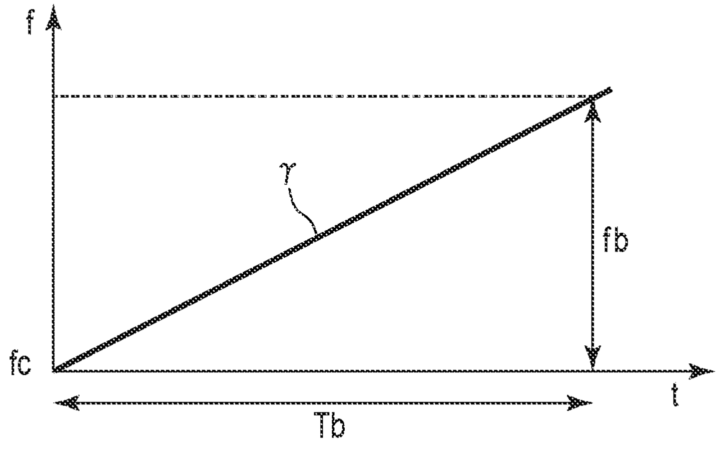

FIGS. 5A and 5B are diagrams illustrating an example of the transmission signal (chirp signal) according to the first embodiment. FIG. 5A illustrates an example of the relationship between the amplitude A of the chirp signal and time t. FIG. 5B illustrates an example of the relationship between the frequency f of the chirp signal and time t. As illustrated in FIG. 5B, the chirp signal is represented by a center frequency fc, a modulation bandwidth fb, and a signal time width Tb. The center frequency fc of the chirp signal may be 40 GHz. The slope of the chirp signal is referred to as frequency change rate (chirp rate) Y. The chirp signal St (t) transmitted from the radar unit 50 is represented by Equation 1.

$$St(t) = \cos\left[2\pi\left(fc \times t + \gamma t^2/2\right)\right] \quad \text{Equation 1}$$

The chirp rate y is represented by Equation 2.

$$\gamma = fb/Tb \quad \text{Equation 2}$$

Waves reflected from a radar inspection target at a distance R away from a plane where the radar unit 50 is located are observed after a delay of Δt=2R/c from the transmission timing, where c is the speed of light. The received chirp signal Sr (t) is represented by Equation 3, where a is the reflection intensity of the inspection target.

$$Sr(t) = a \times \cos\left[2\pi fc(t - \Delta t) + \pi\gamma(t - \Delta t)^2\right] \quad \text{Equation 3}$$

The clock generator 104 generates a clock signal as a high-frequency reference signal. The clock generator 104 may be configured by a crystal oscillator. The frequency of the clock signal may be 40 MHz.

The control signal generator 106 generates a logic signal that is a low-speed square wave signal as the control signal indicating the radar transmission timing of the radar unit 50. The frequency of the control signal may be 40 kHz.

The control signal is a low-frequency signal, and the transmission signal and the reference signal are high-frequency signals. The frequencies of the transmission and reference signals are not limited to the foregoing frequency, but may differ from each other and may be higher than that of the control signal. The frequencies of the transmission and reference signals may be higher than 3 MHz. Alternatively, the frequencies of the transmission and reference signals may be higher than 300 kHz.

Figures 6A, 6B, 6C, 6D, 6E, 6F:
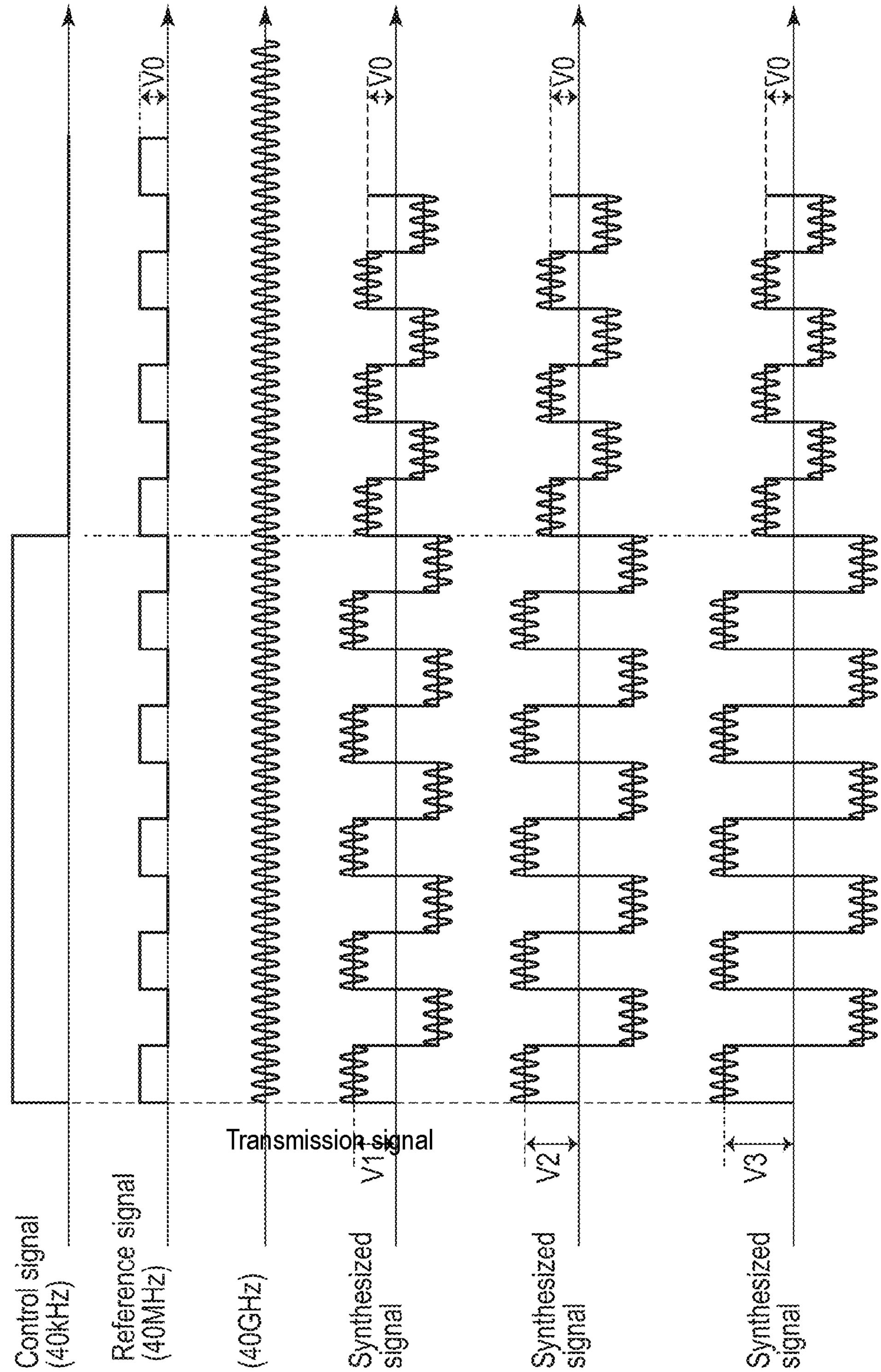
FIGS. 6A, 6B, 6C, 6D, 6E, and 6F are waveform diagrams illustrating an example of signal waveforms of respective elements of the signal generator.

FIGS. 6A to 6F are waveform diagrams illustrating an example of signal waveforms of respective elements of the signal generator 100. FIG. 6A illustrates an example of a waveform of a 40 kHz control signal output from the control signal generator 106. FIG. 6B illustrates an example of a waveform of a 40 MHz reference signal output from the clock generator 104. FIG. 6C illustrates an example of a waveform of a 40 GHz transmission signal output from the local oscillator 102.

The transmission signal (FIG. 6C) is input to a first input terminal of a power synthesizer 114 via a high-pass filter (HPF) 108. The control signal (FIG. 6A) is input to a variable gain amplifier 112. The amplitude (voltage) of the control signal output from the control signal generator 106 is V0. The gain (also referred to as an amplification factor) of the variable gain amplifier 112 is set by a gain controller 118. The amplification factor may be any number that is larger than or equal to 1 or any number that is smaller than or equal to 1. The gain controller 118 sets a gain in accordance with the transmission timing of each of the radar clusters 18 and 20. For example, the gain controller 118 sets the gain to G1, G2, or G3. If the gain is G1, the variable gain amplifier 112 amplifies the control signal to a voltage V1. If the gain is G2, the variable gain amplifier 112 amplifies the control signal to a voltage V2. If the gain is G3, the variable gain amplifier 112 amplifies the control signal to voltage V3. The voltage V2 is higher than the voltage V1. The voltage V3 is higher than the voltage V2.

The control signal output from the variable gain amplifier 112 is added to the reference signal (FIG. 6B), and a result of the addition is input to a second input terminal of the power synthesizer 114 via a low-pass filter (LPF) 110.

The power synthesizer 114 synthesizes the powers of the two input signals. FIG. 6D is a diagram illustrating an example of a synthesized signal output from the power synthesizer 114 when the gain of the variable gain amplifier 112 is G1. A signal obtained by adding the transmission signal to the reference signal is amplitude-modulated by the control signal into the synthesized signal.

FIG. 6E is a diagram illustrating an example of the synthesized signal output from the power synthesizer 114 when the gain of the variable gain amplifier 112 is G2.

FIG. 6F is a diagram illustrating an example of the synthesized signal output from the power synthesizer 114 when the gain of the variable gain amplifier 112 is G3.

The synthesized signal (FIG. 6D, 6E or 6F) output from the power synthesizer 114 is input to the radar cluster 130 via one signal line 116.

The power synthesizer 114 may not be provided. In this case, the output signal of the high-pass filter 108 is input to the radar cluster 130 via a first signal line, and the output signal of the low-pass filter 110 is input to the radar cluster 130 via a second signal line. The first signal line transmits the transmission signal. The second signal line transmits a signal obtained by adding the transmission signal to the reference signal.

Figure 7:
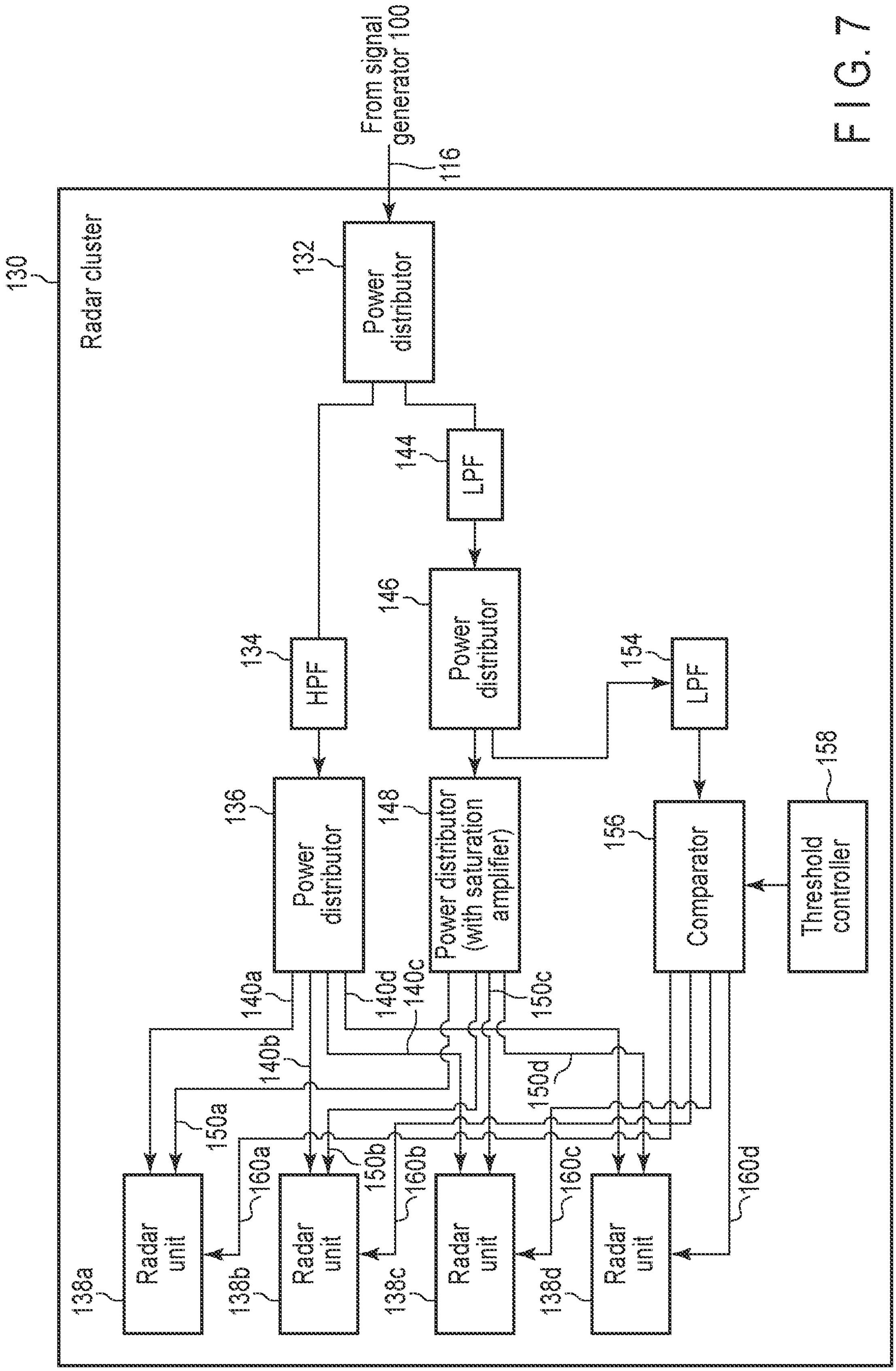
FIG. 7 is a block diagram illustrating an example of the radar cluster according to the first embodiment.

FIG. 7 is a block diagram illustrating an example of the radar cluster 130 according to the first embodiment.

Figure 8:
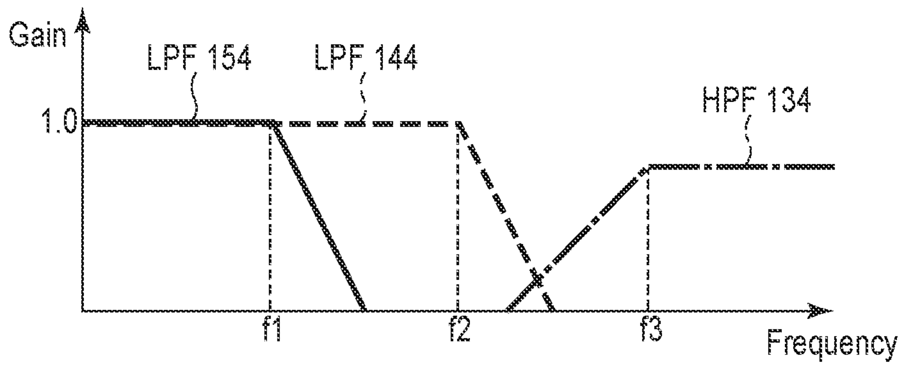
FIG. 8 is a diagram illustrating an example of the characteristics of a high-pass filter and a low-pass filter according to the first embodiment.

FIG. 8 is a diagram illustrating an example of the characteristics of a high-pass filter (HPF) 134, a low-pass filter (LPF) 144, and a low-pass filter (LPF) 154 which are included in the radar cluster 130. In the diagram of FIG. 8, the horizontal axis is a frequency and the vertical axis is a gain.

The gain of the low-pass filter 154 is 1.0 up to a frequency of f1, and decreases as the frequency exceeds f1. The gain of the low-pass filter 154 becomes 0 at a frequency between f1 and f2. An example of frequency f1 is 40 kHz.

The gain of the low-pass filter 144 is 1.0 up to a frequency of f2, and decreases as the frequency exceeds f2. The gain of the low-pass filter 144 becomes 0 at a frequency between f2 and f3. An example of frequency f2 is 40 MHz.

The gain of the high-pass filter 134 is 0 up to a frequency between f2 and f3, and increases as the frequency increases. The gain of the high-pass filter 134 becomes about 0.8 when the frequency is f3. The gain of the high-pass filter 134 is fixed at about 0.8 as the frequency exceeds f3. An example of frequency f3 is 40 GHZ.

Returning to the illustration of FIG. 7, the signal line 116 that transmits the synthesized signal from the signal generator 100 is connected to a power distributor 132. The power distributor 132 distributes the power of the input signal into two output signals. The power of one output signal is about ½ of the power of the input signal.

The first output signal of the power distributor 132 is input to a power distributor 136 via the high-pass filter 134. The high-pass filter 134 extracts the transmission signal from the input signal (synthesized signal).

The power distributor 136 distributes the power of the input signal into four output signals. The power of one output signal is about ¼ of the power of the input signal. The four output signals (the transmission signals) of the power distributor 136 are input to radar units 138*a*, 138*b*, 138*c*, and 138*d* via signal lines 140*a*, 140*b*, 140*c*, and 140*d*, respectively.

The second output signal of the power distributor 132 is input to a power distributor 148 including a saturation amplifier via the low-pass filter 144. The low-pass filter 144 extracts from the input signal the reference signal whose amplitude is modulated by the control signal.

The power distributor 146 distributes the power of the input signal into two output signals. The power of one output signal is about ½ of the power of the input signal. The first output signal of the power distributor 146 is input to the power distributor 148. The second output signal of the power distributor 146 is input to a comparator 156 via the low-pass filter 154. The low-pass filter 154 removes the reference signal whose amplitude is modulated by the control signal and extracts the control signal. The low-pass filter 154 may be replaced with an AM detector (envelope detector) that extracts a modulation signal from a result of the amplitude modulation.

The power distributor 148 incorporates a saturation amplifier. The saturation amplifier shapes the input signal into a square wave. The saturation amplifier removes components due to the control signal from the reference signal whose amplitude is modulated by the control signal to obtain the reference signal. The power distributor 148 distributes the power of the reference signal obtained by the saturation amplifier into four output signals. The power of one output signal is about ¼ of the power of the input signal. The four output signals (reference signals) of the power distributor 148 are input to the radar units 138*a*, 138*b*, 138*c*, and 138*d* via signal lines 150*a*, 150*b*, 150*c*, and 150*d*.

The saturation amplifier may be replaced with a high-pass filter to remove components due to the control signal from the reference signal whose amplitude is modulated by the control signal.

The comparator 156 compares the voltage of the control signal input from the low-pass filter 154 with a threshold voltage set by a threshold controller 158. The threshold controller 158 sets the threshold value of the comparator 156 to a voltage capable of identifying the voltage of the control signal amplified by the variable gain amplifier 112. That is, the threshold controller 158 sets the threshold value of the comparator to V1±α, V2±α, or V3±α.

The comparator 156 compares the voltage of the input signal (control signal) with two threshold voltages, and outputs the input signal if it is within the range of the two threshold voltages. If the threshold voltages are, for example, V1+α and V1−α, the comparator 156 outputs the control signal whose voltage is within V1+α and V1−α to signal lines 160*a* to 160*d*. Accordingly, the control signal of a plurality of voltages are output from the signal generator 100, but only the control signal of a predetermined voltage is input to the radar units 138*a* to 138*d* via the signal lines 160*a* to 160*d*. Thus, the radar units 138*a* to 138*d* respond only to the control signal of the predetermined threshold voltage. Since the voltage of the control signal corresponds to the gain set by the gain controller 118, it is possible to set whether or not the control signal is input to the radar unit 138 by linkage between the gain controller 118 and the threshold controller 158.

Figure 9:
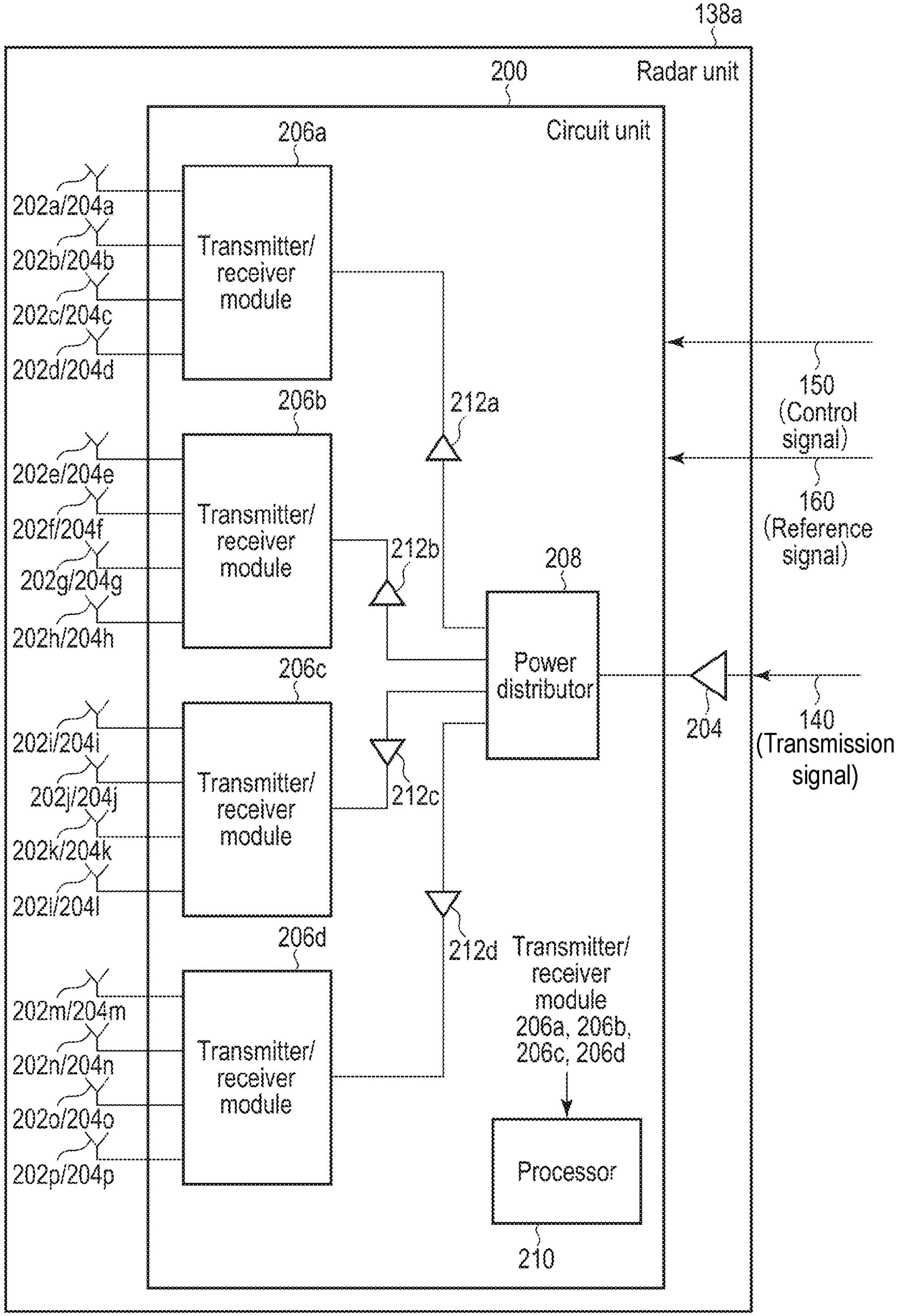
FIG. 9 is a block diagram illustrating an example of a radar unit according to the first embodiment.

FIG. 9 is a block diagram illustrating an example of the radar units 138*a* to 138*d* according to the first embodiment. The radar units 138*a* to 138*d* have the same configuration. As an example, the radar unit 138*a* is shown in FIG. 9.

The radar unit 138*a* includes an amplifier 204, a circuit unit 200, and a plurality of, e.g., 16 transmitting antennas 202*a* to 202*p* and 16 receiving antennas 204*a* to 204*p*. The transmission signal from the power distributor 136 via the signal line 140 is input to the circuit unit 200 via the amplifier 204. The reference signal and the control signal are input to each element in the circuit unit 200.

The circuit unit 200 includes a 1-input/4-output power distributor 208, four transmitter/receiver modules 206*a*, 206*b*, 206*c*, and 206*d*, a processor 210 and amplifiers 212*a*, 212*b*, 212*c*, and 212*d*. The power distributor 208 distributes the input signal to four output signals. The first output signal of the power distributor 208 is input to the transmitter/receiver module 206*a* via the amplifier 212*a*. The second output signal of the power distributor 208 is input to the transmitter/receiver module 206*b* via the amplifier 212*b*. The third output signal of the power distributor 208 is input to the transmitter/receiver module 206*c* via the amplifier

212*c*. The fourth output signal of the power distributor 208 is input to the transmitter/receiver module 206*d* via the amplifier 212*d*.

It is not essential to provide the amplifiers 204 and 212*a* to 212*d*, and at least some of these amplifiers may not be provided.

The transmitter/receiver module 206*a* is connected to four transmitting antennas 202*a*, 202*b*, 202*c*, and 202*d* and four receiving antennas 204*a*, 204*b*, 204*c*, and 204*d*. The transmitter/receiver module 206*b* is connected to four transmitting antennas 202*e*, 202*f*, 202*g*, and 202*h* and four receiving antennas 204*e*, 204*f*, 204*g*, and 204*h*. The transmitter/receiver module 206*c* is connected to four transmitting antennas 2021, 202*j*, 202*k*, and 202*l* and four receiving antennas 2041, 204*j*, 204*k* and 204*l*. The transmitter/receiver module 206*d* is connected to four transmitting antennas 202*m*, 202*n*, 202*o*, and 202*p* and four receiving antennas 204*m*, 204*n*, 204*o*, and 204*p*.

The signal lines between the amplifier 204 and the power distributor 208 and between the power distributor 208 and the transmitter/receiver modules 206*a* to 206*d* may be formed of cables. Each of the transmitting modules 206*a* to 206*d* may be configured by an integrated circuit. If each of the transmitter/receiver modules 206*a* to 206*d* is configured by an integrated circuit, the signal lines between the amplifier 204 and the power distributor 208 and between the power distributor 208 and the transmitter/receiver modules 206*a* to 206*d* may be formed by a printed pattern on a printed circuit board.

The signal lines between the power distributor 208 and the transmitter/receiver modules 206*a* to 206*d* are of equal length.

The output signals of the transmitter/receiver modules 206*a* to 206*d* are input to the processor 210. The processor 210 processes the input signal to generate an image signal. The operator can observe the image to detect a specific inspection target. The processor 210 may process the input signal to detect a specific inspection target and generate an alarm.

Figure 10:
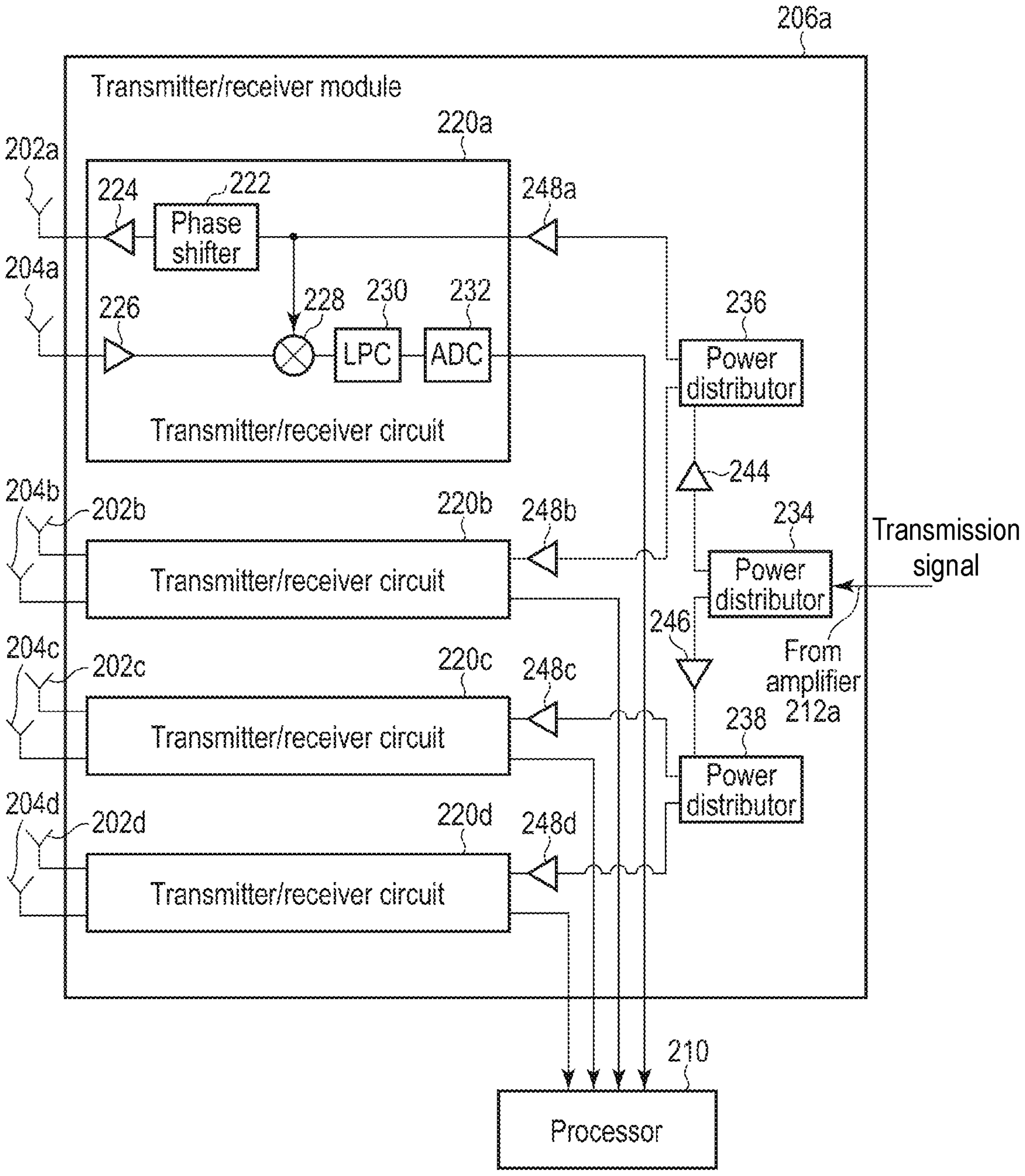
FIG. 10 is a block diagram illustrating an example of a transmitter/receiver module according to the first embodiment.

FIG. 10 is a block diagram illustrating an example of the transmitter/receiver module 206 according to the first embodiment. The transmitter/receiver modules 206*a* to 206*d* have the same configuration. As an example, the transmitter/receiver module 206*a* is shown in FIG. 10. The transmitter/receiver module 206*a* includes transmitter/receiver circuits 220*a*, 220*b*, 220*c*, and 220*d* and 1-input/2-output power distributors 234, 236 and 238. The transmitter/receiver circuits 220*a* to 220*d* has the same configuration. As an example, the transmitter/receiver circuit 220*a* is shown in detail in FIG. 10.

The transmission signal is input from the amplifier 212*a* to the 1-input/2-output power distributor 234. The power distributor 234 distributes the input signal into two output signals. The first output signal of the power distributor 234 is input to the 1-input/2-output power distributor 236 via an amplifier 244. The second output signal of the power distributor 234 is input to the 1-input/2-output power distributor 238 via an amplifier 246.

The power distributor 236 distributes the input signal into two output signals. The first output signal of the power distributor 236 is input to the transmitter/receiver circuit 220*a* via an amplifier 248*a*. The second output signal of the power distributor 236 is input to the transmitter/receiver circuit 220*b* via an amplifier 248*b*.

The power distributor 238 distributes the input signal into two output signals. The first output signal of the power distributor 238 is input to the transmitter/receiver circuit 220*c* via an amplifier 248*c*. The second output signal of the power distributor 238 is input to the transmitter/receiver circuit 220*d* via an amplifier 248*d*.

The three 1-input/2-output power distributors 234, 236 and 238 may be replaced with a single 1-input/4-output power distributor.

The transmitter/receiver circuit 220*a* includes a phase shifter 222, amplifiers 224 and 226, a mixer 228, a low-pass filter (LPF) 230, and an analog-to-digital converter (ADC) 232.

The transmission signal is input to the transmitting antenna 202*a* via the phase shifter 222 and the amplifier 224. The transmitting antenna 202*a* irradiates an inspection target with electromagnetic waves corresponding to the transmission signal. The phase shifter 222 applies a phase difference to the transmission signals to be supplied to the transmitting antennas 202*a*, 202*b*, 202*c*, and 202*d* to control the irradiation direction of the electromagnetic waves.

The electromagnetic waves reflected from the inspection target are received by the receiving antenna 204*a*. The received signal output from the receiving antenna 204*a* is input to the first input terminal of the mixer 228 via the amplifier 226. A transmission signal is input to the second input terminal of the mixer 228. The mixer 228 multiplies the received signal and the transmission signal of the receiving antenna 204*a* to generate an intermediate frequency signal.

The intermediate frequency signal output from the mixer 228 is input to the processor 210 via the low-pass filter 230 and the analog-to-digital converter 232.

The reflected waves of the electromagnetic waves radiated from a certain radar unit 138 may be received by another radar unit 138, or the reflected waves of the electromagnetic waves radiated from a certain radar unit 138 may be received by the certain radar unit 138.

Figure 11A:
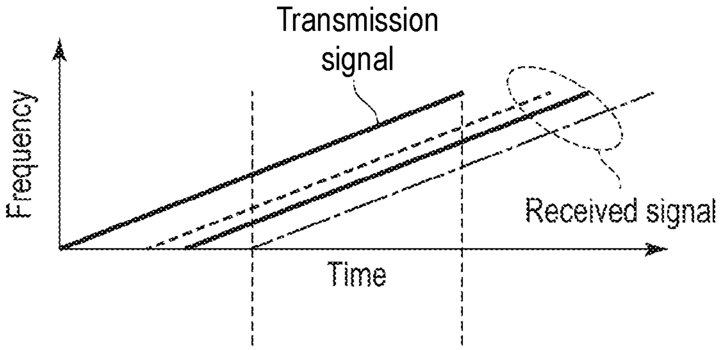
FIGS. 11A, 11B, and 11C are block diagrams illustrating an example of a detecting operation of the radar system according to the first embodiment.
Figure 11B:
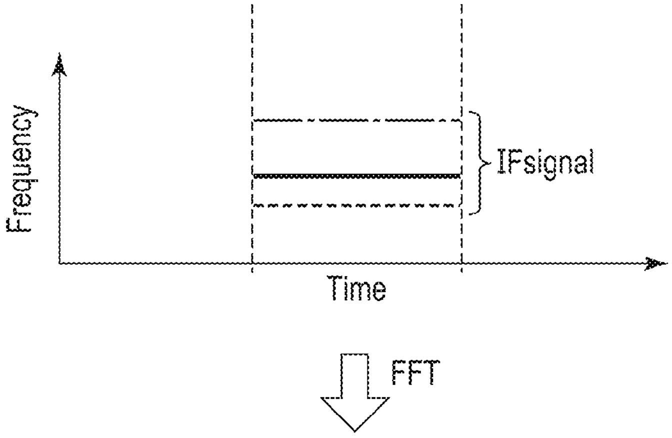
Figure 11C:
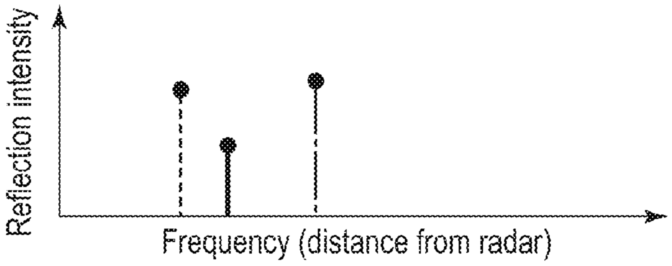

FIGS. 11A to 11C are block diagrams illustrating an example of the detecting operation of the radar system according to the first embodiment. FIGS. 11A to 11C illustrate the principle of detection of a plurality of, e.g., three objects. FIG. 11A shows a relationship between a transmission signal (FIGS. 5A and 5B) and a time, and a relationship between received signals and a time. As shown in FIG. 11A, the frequency of the transmission signal varies linearly with time. The received signal is delayed with respect to the transmission signal by Δt. If there are a plurality of objects, the waves reflected from the nearest object, indicated by the broken line, are received earliest, and the waves reflected from the farthest object, indicated by the one-dot-one-dash line, are received latest.

As illustrated in FIG. 10, the received signal is multiplied by the transmission signal by the mixer 228 to be an intermediate frequency signal z (t). The intermediate frequency signal z (t) is represented by Equation 4.

$$z(t) = a \times \cos(2\pi \Delta t \gamma t) \quad \text{Equation 4}$$

FIG. 11B illustrates a relationship between the frequency of the intermediate frequency signal and time. Under an ideal environment free from noise or the like, the frequency is constant for each reflected wave. The frequency of the intermediate frequency signal of waves reflected from the nearest object, which is indicated by the broken line, is the lowest, and the frequency of the intermediate frequency signal of waves reflected from the farthest object, which is indicated by the one-dot-one-dash line, is the highest.

The processor 210 performs a Fourier transform process on the intermediate frequency signal z(t) in a time domain represented by Equation 4 to obtain the reflection intensity of a frequency domain. Thus, the amplitude at each point in a frequency domain resulting from the Fourier transform process on the intermediate frequency signal corresponds to the reflection intensity for each distance from the plane where the radar unit 138 is located. Equation 5 represents a relationship between frequency $f_{if}$ and distance R.

$$f_{if} = \Delta t\gamma = 2R\gamma/c \qquad \text{Equation 5}$$

FIG. 11C illustrates a relationship between the reflection intensity and the frequency obtained by a Fourier transform process on the intermediate frequency signal in a time domain. As is seen from FIG. 11C, the processor 210 can determine the amplitude of a frequency domain signal of the intermediate frequency signal to determine reflection intensity for each distance from a panel 2.

As the electromagnetic waves used in the first embodiment, electromagnetic waves having a wavelength of 1 millimeter to 30 millimeters may be used. Electromagnetic waves having a wavelength of 1 millimeter to 10 millimeters are referred to millimeter waves. Electromagnetic waves having a wavelength of 10 millimeters to 100 millimeters are referred to microwaves. In addition, electromagnetic waves having a wavelength of 100 micrometers to 1 millimeter, which are referred to as terahertz waves, may be used.

The foregoing electromagnetic waves are reflected by a skin of an inspection target. The electromagnetic waves are also reflected by a metal object such as a handgun and a knife. The reflectance of the metal object is higher than that of the skin. The intensity of the reflected waves of the metal object is higher than that of the reflected waves of the skin. The electromagnetic waves are absorbed by powders such as explosives. The reflectance of the powders is lower than that of the skin. The intensity of the reflected waves depends on the type of material from which the electromagnetic waves are reflected, such as the skin, the metal object, and the powder. Therefore, the type of the material at a reflection point at each distance can be obtained from the intensity of the reflected wave at each distance.

The signal generator 100 according to the first embodiment synthesizes the transmission signal, the reference signal, and the control signal. The signal generator 100 transmits one synthesized signal to the radar cluster 130 via one signal line 116. By combining the signal lines between the signal generator 100 and the radar cluster 130 into one signal line 116, wiring between the signal generator 100 and the radar cluster 130 can easily be achieved, with the result that wiring costs and cable costs can greatly be decreased.

Second Embodiment

Figure 12:
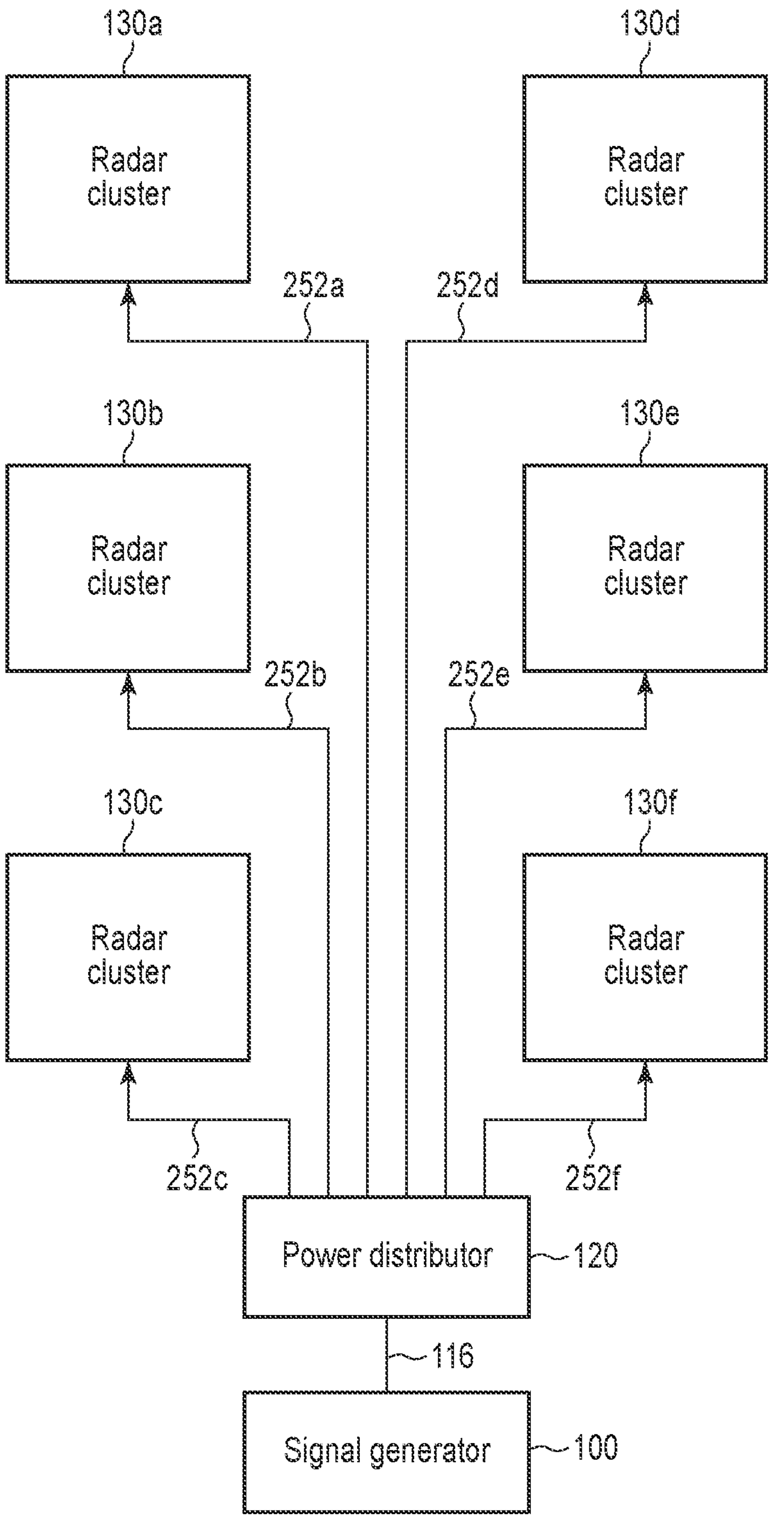
FIG. 12 is a block diagram illustrating an example of a radar system according to a second embodiment.

FIG. 12 is a block diagram illustrating an example of a radar system according to the second embodiment. The radar system includes the signal generator 100, the power distributor 120, and a plurality of radar clusters 130. As an example, six radar clusters 130*a*, 130*b*, 130*c*, 130*d*, 130*e*, and 130*f* are shown in FIG. 12. The signal generator 100 has the same configuration as that of the signal generator according to the first embodiment, and the radar cluster 130*a* to 130*f* have the same configuration as that of the radar cluster 130 according to the first embodiment.

The number of signal generator 100 is one. The number of radar clusters 130 is six. Thus, the power distributor 120 distributes the synthesized signal transmitted from the signal generator 100 via the signal line 116 into six output signals. The first output signal of the power distributor 120 is input to the radar cluster 130*a* via a signal line 252*a*. The second output signal of the power distributor 120 is input to the radar cluster 130*b* via a signal line 252*b*. The third output signal of the power distributor 120 is input to the radar cluster 130*c* via a signal line 252*c*. The fourth output signal of the power distributor 120 is input to the radar cluster 130*d* via a signal line 252*d*. The fifth output signal of the power distributor 120 is input to the radar cluster 130*e* via a signal line 252*e*. The sixth output signal of the power distributor 120 is input to the radar cluster 130*f* via a signal line 252*f*. The signal lines 252*a* to 252*f* are of equal length.

In the radar system according to the second embodiment, the synthesized signal of the transmission signal, the reference signal, and the control signal which is output from the signal generator 100 is input to the power distributor 120 via the single signal line 116. The synthesized signal is distributed by the power distributor 120 and transmitted to the radar clusters 130*a* to 130*f* via the signal lines 252*a* to 252*f* of equal length. As a result, all the radar clusters 130*a* to 130*f* can operate synchronously based on the synthesized signal output from one signal generator 100. Wiring between the signal generator 100 and the radar clusters 130 can easily be achieved, with the result that wiring costs and cable costs can greatly be decreased.

The signal generator 100 generates a synthesized signal for each radar cluster. For example, at certain timing, the signal generator 100 generates a synthesized signal to instruct the radar cluster 130*a* to transmit electromagnetic waves. At the next timing, the signal generator 100 generates a synthesized signal to instruct another radar cluster 130*b* to receive electromagnetic waves. The synthesized signal is input to all the radar clusters 130*a* to 130*f* via the power distributor 120. If, therefore, there is no identification information for each of the radar clusters 130*a* to 130*f* in the control signal, all the radar clusters 130*a* to 130*f* transmit electromagnetic waves.

The signal generator 100 according to the second embodiment includes the variable gain amplifier 112 (FIG. 4) to amplify the voltage of the control signal to one of different voltages. The radar cluster 130 according to the second embodiment includes the comparator 156 (FIG. 7) that compares the voltage of the control signal transmitted from the low-pass filter 154 with a plurality of threshold voltages from the threshold controller 158. The comparator 156 transmits only the control signal having a predetermined voltage to the radar cluster 130. The variable gain amplifier 112 thus amplifies the voltage of the transmission signal to a voltage corresponding to a radar cluster 130 to which the transmission signal is supplied. The comparator 156 of each radar cluster 130 can recognize a radar cluster to which the control signal is transmitted, in accordance with the voltage of the control signal. The comparator 156 transmits only the control signal having a voltage corresponding to its own radar cluster. Accordingly, the electromagnetic wave transmission start time of each radar cluster 130 can be set at an optional time rather than at the same time.

If the number of radar clusters 130 is large, a plurality of power distributors may be provided instead of distributing one synthesized signal to all radar clusters by one power distributor. One power distributor may branch a synthesized signal into two signals, and each of the signals may be distributed to half the radar clusters by two power distributors.

Third Embodiment

Figure 13:
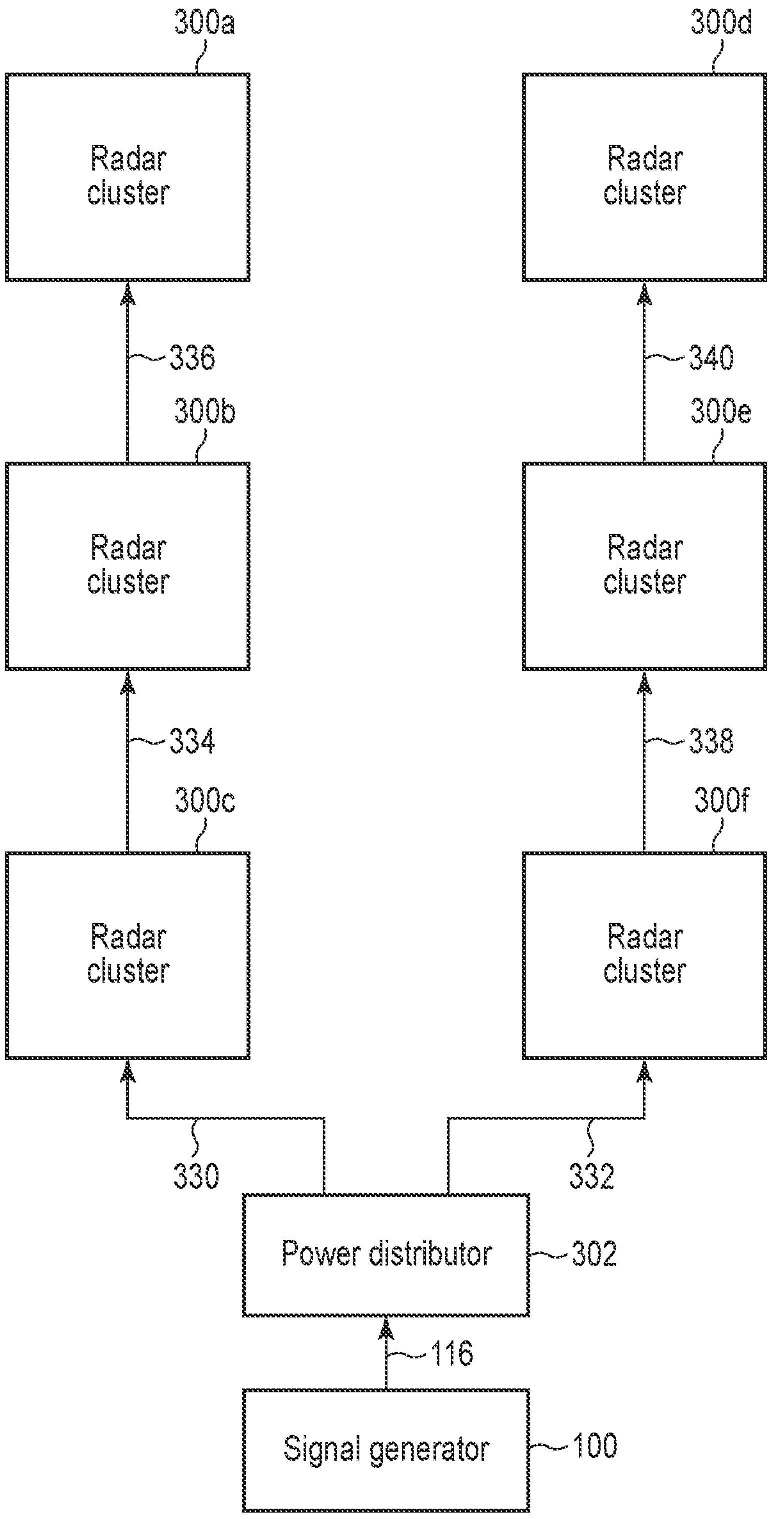
FIG. 13 is a block diagram illustrating an example of a radar system according to a third embodiment.

FIG. 13 is a block diagram illustrating an example of a radar system according to the third embodiment. In the second embodiment, the power distributor transmits the synthesized signal to all the radar clusters 130. In the third embodiment, a power distributor transmits the synthesized signal to a predetermined number of radar clusters. A certain radar cluster received the synthesized signal and transmits the received synthesized signal to another radar cluster.

The radar system includes the signal generator 100, a power distributor 302, and a plurality of radar clusters 300. As an example, six radar clusters 300*a*, 300*b*, 300*c*, 300*d*, 300*e*, and 300*f* are shown in FIG. 13. Half of the radar clusters, e.g., the radar clusters 300*a*, 300*b*, and 300*c* are placed on the sidewall 14. The remaining radar clusters, e.g., the radar clusters 300*d*, 300*e*, and 300*f* are placed on the sidewall 16. The signal generator 100 has the same configuration as that of the signal generator 100 according to the first embodiment.

The power distributor 302 distributes an input signal into two output signals. The first output signal of the power distributor 302 is input to the radar cluster 300*c* via a signal line 330. The second output signal of the power distributor 302 is input to the radar cluster 300*f* via a signal line 332.

The radar cluster 300*c* is connected to the radar cluster 300*b* via a signal line 334. The radar cluster 300*b* is connected to the radar cluster 300*a* via a signal line 336. The radar cluster 300*f* is connected to the radar cluster 300*e* via a signal line 338. The radar cluster 300*e* is connected to the radar cluster 300*d* via a signal line 340.

The power distributor 302 does not distribute the synthesized signal to all of the radar clusters 300*a* to 300*f* from the signal generator 100, but to one of the radar clusters placed on the sidewall 14 and one of the radar clusters placed on the sidewall 16, e.g., radar clusters 300*c* and 300*f*. The two radar clusters 300*c* and 300*f* respectively transmits the distributed synthesized signals to the other radar clusters 300*b* and 300*e*. Thus, the synthesized signal is input to a radar cluster via another radar cluster.

Figure 14:
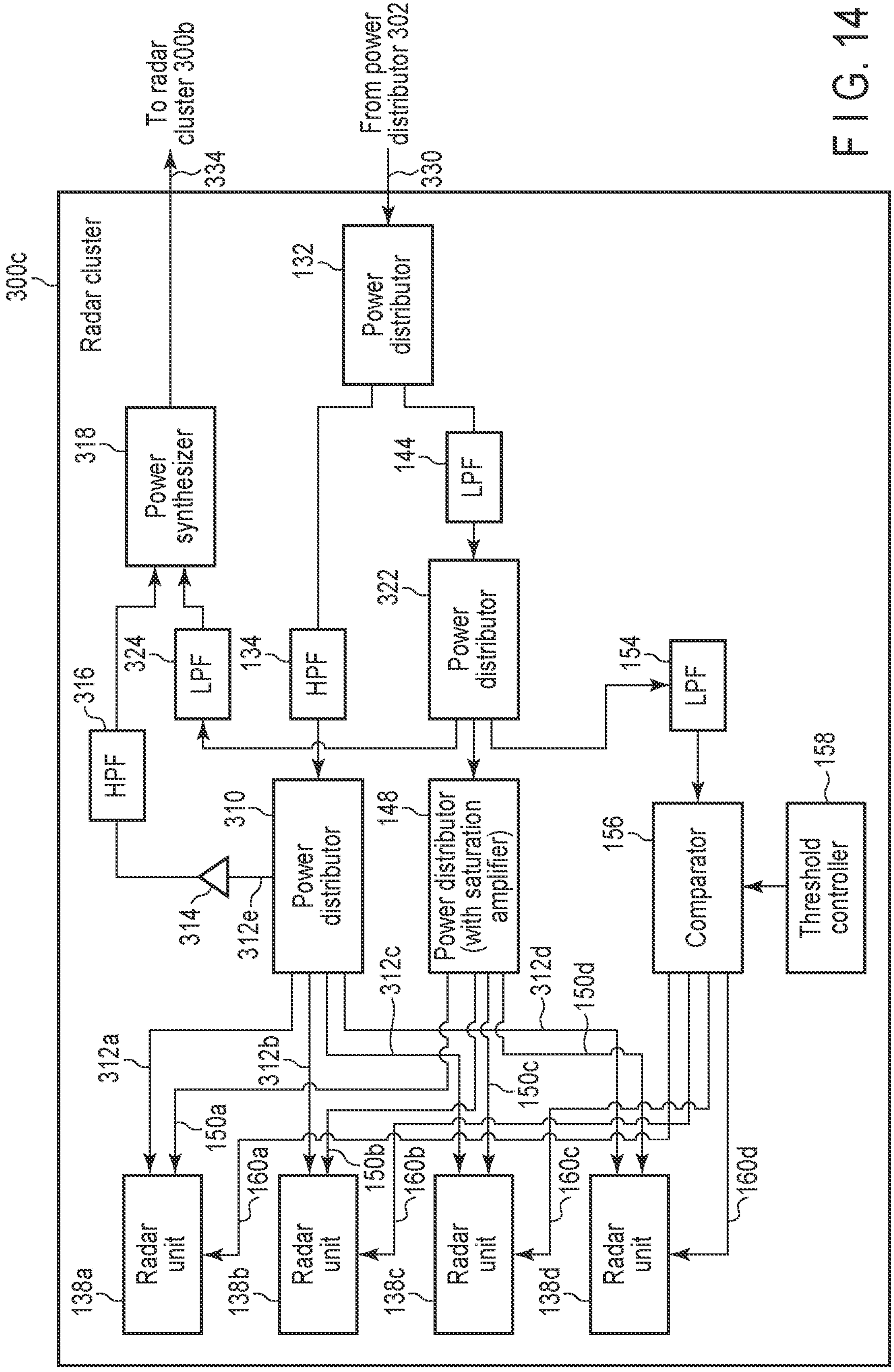
FIG. 14 is a block diagram illustrating an example of a radar cluster according to the third embodiment.

FIG. 14 is a block diagram illustrating an example of the radar clusters 300*a* to 300*f* according to the third embodiment. The radar clusters 300*a* to 300*f* have the same configuration. As an example, the radar cluster 300*c* is shown in FIG. 14. The radar cluster 300*c* includes the radar cluster 130 (FIG. 7) of the first embodiment. The same components of the radar cluster 300*c* as those of the radar cluster 130 are denoted by the same reference numerals, and their detailed descriptions will be omitted.

The synthesized signal supplied from the power distributor 302 via the signal line 330 is input to the power distributor 132. The first output signal of the power distributor 132 is input to the high-pass filter 134. The high-pass filter 134 extracts the transmission signal from the synthesized signal. The output signal (transmission signal) of the high-pass filter 134 is input to the power distributor 310. The power distributor 310 distributes the power of the input signal into five output signals. The power of one output signal is about ⅕ of the power of the input signal.

The first to fourth output signals (the transmission signals) of the power distributor 310 are input to the radar units 138*a*, 138*b*, 138*c*, and 138*d* via signal lines 312*a*, 312*b*, 312*c* and 312*d*, respectively.

The fifth output signal (transmission signal) of the power distributor 310 is input to an amplifier 314 via a signal line 312*e*. The amplifier 314 amplifies the transmission signal. Since the synthesized signal is transmitted through a radar cluster, its transmission path is lengthened. The transmission signal of a high frequency is attenuated according to the transmission distance. To compensate for this attenuation, the amplifier 314 amplifies the transmission signal.

The output signal of the amplifier 314 is input to a first input terminal of a power synthesizer 318 via a high-pass filter 316. The frequency characteristics of the high-pass filter 316 are the same as those of the high-pass filter 134 (FIG. 8). The high-pass filter 316 extracts the transmission signal.

The second output signal of the power distributor 132 is input to the low-pass filter 144. The low-pass filter 144 extracts from the synthesized signal the reference signal whose amplitude is modulated by the control signal. The output signal of the low-pass filter 144 is input to the power distributor 322. The power distributor 322 distributes the power of the input signal into three output signals. The power of one output signal is about ⅓ of the power of the input signal.

The first output signal of the power distributor 322 is input to the power distributor 148. The power distributor 148 includes the saturation amplifier. The power distributor 148 removes a component of the control signal from the reference signal whose amplitude is modulated by the control signal to obtain the reference signal. Four output signals (reference signals) of the power distributor 148 are input to the radar units 138*a*, 138*b*, 138*c*, and 138*d* via the signal lines 150*a*, 150*b*, 150*c*, and 150*d*, respectively.

The second output signal of the power distributor 322 is input to the comparator 156 via the low-pass filter 154. The comparator 156 transmits the control signal of a predetermined threshold voltage to the radar units 138*a*, 138*b*, 138*c*, and 138*d* via the signal lines 160*a*, 160*b*, 160*c*, and 160*d*, respectively.

The third output signal of the power distributor 322 is input to a second input terminal of the power synthesizer 318 via a low-pass filter 324. The frequency characteristics of the low-pass filter 324 are the same as those of the low-pass filter 144 (FIG. 8). The low-pass filter 324 extracts the reference signal whose amplitude is modulated by the control signal.

The power synthesizer 318 synthesizes the transmission signal and the reference signal whose amplitude is modulated by the control signal. The synthesized signal is equivalent to the signal input to the power distributor 132.

In the radar system according to the third embodiment, the synthesized signal generated from the signal generator 100 is distributed into two signals by the power distributor 302 (FIG. 13). The synthesized signal output from the power distributor 302 is input to radar clusters via other radar clusters. The number of output terminals of the power distributor 302 is smaller than that in the second embodiment. As compared with the second embodiment, therefore, the wiring costs can be reduced and so can be the wiring area.

In the third embodiment, the transmission paths of the synthesized signals between the signal generator 100 and the radar clusters 300 are different in length. As the transmission path becomes longer, the control signal is attenuated, and the accuracy of the control signal may be degraded. In the signal generator 100, the variable gain amplifier 112 amplifies the control signal. The variable gain amplifier 112 amplifies the control signal with a gain corresponding to a distance between the signal generator 100 and the radar cluster 300 to which the control signal is transmitted. The variable gain amplifier 112 amplifies the voltage of the control signals of radar clusters 300*a* and 300*d* with the largest distance from the signal generator 100 to the highest voltage. The variable gain amplifier 112 amplifies the voltage of the control signals of the radar clusters 300*c* and 300*f* with the smallest distance from the signal generator 100 to the lowest voltage. Thus, attenuation can be compensated while the control signal is input to the radar clusters 300, and all radar clusters 300 can receive the control signals with the same accuracy.

In the second and third embodiments, the power distributors 120 and 302 are installed on one of the sidewalls 14 and 16. In the second embodiment, three signal lines, e.g., signal lines 252*a*, 252*b*, and 252*c* may extend from the power distributor 120 across the passage 12. In the third embodiment, one signal line, e.g., the signal line 330 may extend from the power distributor 302 across the passage 12. The smaller the number of signal lines across the passage 12, the lower the wiring costs. Thus, the third embodiment is more suitable for a walk-through radar system than the second embodiment.

Like in the radar system according to the second embodiment, in the radar system according to the third embodiment, the voltage of the control signal is variably amplified by linkage between the variable gain amplifier 112 of the signal generator 100 and the comparator 156 of the radar cluster 130 to allow the electromagnetic wave transmission start time of each radar cluster to be set at an optional time rather than at the same time.

Figure 15:
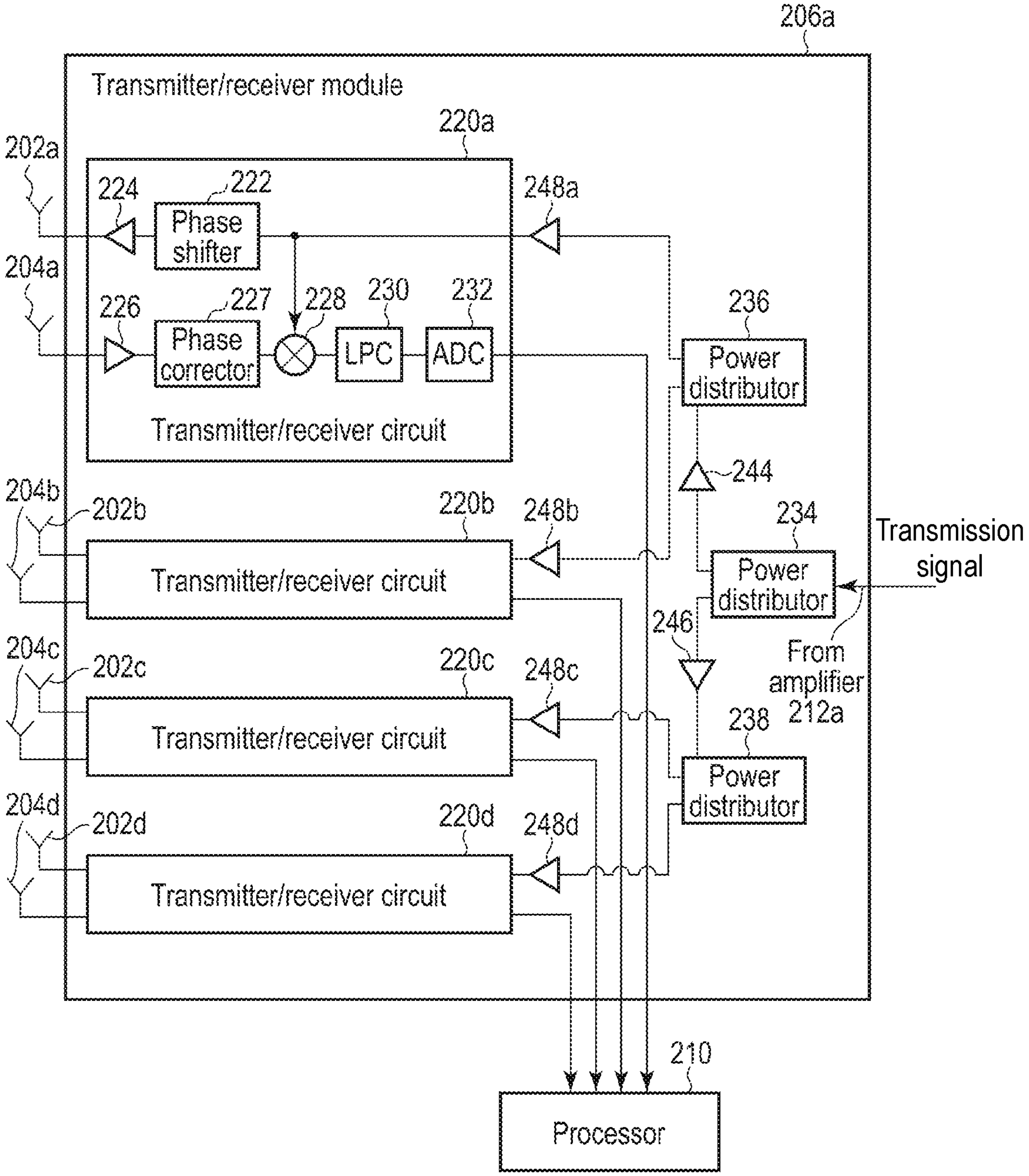
FIG. 15 is a block diagram illustrating an example of a transmitter/receiver module according to the third embodiment.

In the third embodiment, the transmission paths of the synthesized signal between the signal generator 100 and the radar clusters 300 are different in length. The difference in transmission path length may cause phase errors in the synthesized signal. An example of a transmitter/receiver module which electronically corrects the phase errors will be described. FIG. 15 is a block diagram illustrating an example of the transmitter/receiver module 206*a* according to the third embodiment. In the transmitting receiving circuit 220, a phase corrector 227 is connected between the amplifier 226 and the mixer 228. The phase corrector 227 shifts the phase of the received transmission signal.

The administrator of the radar system measures a phase error of each radar cluster 300 at the time of installation. This measurement is performed by placing a corner reflector in front of the radar system. The corner reflector is irradiated with electromagnetic waves. Since the waves reflected from the corner reflector are known, the processor 210 detects a phase error of a signal received by each antenna 204 for each radar cluster based on the reflected waves from the corner reflector. The processor 210 obtains a correction value for correcting the phase error. The processor 210 sets a correction value for each antenna for each radar cluster to the phase corrector 227.

If the radar system operates, the phase corrector 227 corrects the phase of the received signal of waves reflected from a target object in accordance with the correction value. Thus, even if a phase error of the received signal due to a difference in the transmission path length of the synthesized signal occurs in each radar cluster 300, the phase error is corrected and thus the phases of the intermediate frequency signals can be aligned. High detection accuracy can thus be maintained.

Note that the difference in the transmission path length of the synthesized signal need not be always corrected electronically, but can also be corrected physically. In the radar cluster 300 far from the power distributor 302, the signal line from the power distributor 132 to the radar unit 138 may be lengthened. The signal line from the power distributor 132 to the radar unit 138 in the radar clusters 300*b* and 300*e* may be set longer than the signal line from the power distributor 132 to the radar unit 138 in the radar clusters 300*c* and 300*f*. The signal line from the power distributor 132 to the radar unit 138 in the radar clusters 300*a* and 300*d* may be set longer than the signal line from the power distributor 132 to the radar unit 138 in the radar clusters 300*b* and 300*e*.

If the total number of radar clusters 300 is small, the power distributor 302 may be omitted, all the radar clusters 300 may be connected in series, and the signal generator 100 may be connected to an input terminal of the series-connected radar clusters. Conversely, if the total number of radar clusters 300 is large, a plurality of power distributors 302 may be connected step by step.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A signal generating device connected to a first radar and a second radar, the signal generating device comprising:

a high-frequency signal generator configured to generate a high-frequency signal;

a control signal generator configured to generate a first control signal for controlling the first radar and a second control signal for controlling the second radar; and a signal synthesizer configured to generate a first synthesized signal and a second synthesized signal, the first synthesized signal including the high-frequency signal and the first control signal, and the second synthesized signal including the high-frequency signal and the second control signal, wherein:

a frequency of the high-frequency signal is higher than a frequency of the first control signal and a frequency of the second control signal, the second radar is connected to the first radar;

a distance between the signal generating device and the second radar is longer than a distance between the signal generating device and the first radar; and an amplitude of the second control signal is larger than an amplitude of the first control signal.

2. The signal generating device of claim 1, wherein the high-frequency signal includes at least one of a transmission signal for transmitting electromagnetic waves from the first radar and the second radar and a reference signal of the first radar and the second radar.

3. The signal generating device of claim 1, wherein the high-frequency signal includes a synthesized signal of a transmission signal for transmitting electromagnetic waves from the first radar and the second radar and a reference signal of the first radar and the second radar.

4. The signal generating device of claim 1, further comprising a power distributor, wherein the power distributor is configured to receive one of the first synthesized signal and the second synthesized signal and distribute the one of the first synthesized signal and the second synthesized signal to the first radar and the second radar.

5. The signal generating device of claim 1, wherein:

one of the first synthesized signal and the second synthesized signal is transmitted to the first radar; and the one of the first synthesized signal and the second synthesized signal is transmitted from the first radar to the second radar.

6. The signal generating device of claim 1, which is connected to a third radar, wherein:

the control signal generator is configured to generate a third control signal for controlling the third radar;

the signal synthesizer is configured to generate a third synthesized signal including the high-frequency signal and the third control signal; and a frequency of the high-frequency signal is higher than a frequency of the third control signal.

7. The signal generating device of claim 6, wherein:

the third radar is connected to the second radar;

a distance between the signal generating device and the third radar is longer than a distance between the signal generating device and the second radar; and an amplitude of the third control signal is larger than an amplitude of the second control signal.

8. A radar system comprising:

the signal generating device of claim 1;

the first radar; and the second radar.

9. The signal generating device of claim 1, wherein:

a voltage of the first control signal is set in accordance with the first radar, a voltage of the second control signal is set in accordance with the second radar, the first synthesized signal is an alternating signal, and the second synthesized signal is an alternating signal.

10. The signal generating device of claim 1, wherein at least one of a gain or a voltage of the second control signal is larger than at least one of a gain or a voltage of the first control signal.

11. The signal generating device of claim 1, further comprising a comparator configured to receive the first synthesized signal and the second synthesized signal and to output a first signal in a first voltage range and a second signal in a second voltage range, wherein the first synthesized signal is transmitted to the first radar from the comparator and the second synthesized signal is transmitted to the second radar from the comparator.

12. A signal generating device connected to a first radar and a second radar, the signal generating device comprising:

a high-frequency signal generator configured to generate a high-frequency signal;

a control signal generator configured to generate a first control signal for controlling the first radar and a second control signal for controlling the second radar; and a signal synthesizer configured to generate a first synthesized signal and a second synthesized signal, the first synthesized signal including the high-frequency signal and the first control signal, and the second synthesized signal including the high-frequency signal and the second control signal, wherein:

a frequency of the high-frequency signal is higher than a frequency of the first control signal and a frequency of the second control signal;

one of the first synthesized signal and the second synthesized signal is transmitted to the first radar; and the one of the first synthesized signal and the second synthesized signal is transmitted from the first radar to the second radar.

13. A signal generating device connected to a first radar, a second radar, and a third radar, the signal generating device comprising:

a high-frequency signal generator configured to generate a high-frequency signal;

a control signal generator configured to generate a first control signal for controlling the first radar, a second control signal for controlling the second radar, and a third control signal for controlling the third radar; and a signal synthesizer configured to generate a first synthesized signal, a second synthesized signal, and a third synthesized signal, the first synthesized signal including the high-frequency signal and the first control signal, the second synthesized signal including the high-frequency signal and the second control signal, and the third synthesized signal including the high-frequency signal and the third control signal, wherein:

a frequency of the high-frequency signal is higher than a frequency of the first control signal, a frequency of the second control signal, and a frequency of the third control signal;

the third radar is connected to the second radar;

a distance between the signal generating device and the second radar is longer than a distance between the signal generating device and the first radar;

a distance between the signal generating device and the third radar is longer than a distance between the signal generating device and the second radar;

an amplitude of the second control signal is larger than an amplitude of the first control signal; and an amplitude of the third control signal is larger than an amplitude of the second control signal.

* * * * *